US011278820B2

(12) United States Patent
Wildhaber

(10) Patent No.: US 11,278,820 B2
(45) Date of Patent: Mar. 22, 2022

(54) METHOD AND APPARATUS FOR DETECTION OF LIGHT-MODULATED SIGNALS IN A VIDEO STREAM

(71) Applicant: Fabien Wildhaber, Troistorrents (CH)

(72) Inventor: Fabien Wildhaber, Troistorrents (CH)

(73) Assignee: Vizar Technologies Sàrl, Lausanne (CH)

( * ) Notice: Subject to any disclaimer, the term of this patent is extended or adjusted under 35 U.S.C. 154(b) by 390 days.

(21) Appl. No.: 16/346,036

(22) PCT Filed: Oct. 31, 2017

(86) PCT No.: PCT/IB2017/056759
§ 371 (c)(1),
(2) Date: Apr. 29, 2019

(87) PCT Pub. No.: WO2018/078607
PCT Pub. Date: May 3, 2018

(65) Prior Publication Data
US 2021/0283513 A1   Sep. 16, 2021

(30) Foreign Application Priority Data

Oct. 31, 2016 (CH) .................................. 01456/16

(51) Int. Cl.
*A63F 13/837* (2014.01)
*A63F 13/213* (2014.01)
(Continued)

(52) U.S. Cl.
CPC .......... *A63F 13/837* (2014.09); *A63F 13/213* (2014.09); *A63F 13/216* (2014.09);
(Continued)

(58) Field of Classification Search
CPC ...... G06F 3/011; G06F 3/0304; A63F 13/213; A63F 13/216; A63F 13/42; A63F 13/837
See application file for complete search history.

(56) References Cited

U.S. PATENT DOCUMENTS 7,502,053 B2   3/2009   Kagawa et al.
8,824,736 B2   9/2014   Lefevre et al.
(Continued)

FOREIGN PATENT DOCUMENTS

FR    2911707 A1     7/2008
JP    2003348424 A   12/2003
(Continued)

OTHER PUBLICATIONS

International Search Report and Written Opinion for PCT/IB2017/056759 dated Feb. 20, 2018, 12 pages.
(Continued)

*Primary Examiner* — Steve Rowland
(74) *Attorney, Agent, or Firm* — Blank Rome LLP

(57) ABSTRACT

A method for detection of an emitter mobile device (B) equipped with a light by a receiver mobile device (A) equipped with a camera, comprising: the emitter mobile device (B) emits a light-modulated signal to advertise its identity or state; the receiver mobile device (A) captures a series of frames with said camera; the modulated signal is detected from said frames; the pixel position of the emitter mobile device on a within the camera frame of the receiver mobile device is detected.

20 Claims, 21 Drawing Sheets

(51) Int. Cl.
  *A63F 13/216* (2014.01)
  *A63F 13/42* (2014.01)
  *A63F 13/92* (2014.01)
  *G01S 5/16* (2006.01)
  *G06F 3/03* (2006.01)
  *G06F 3/01* (2006.01)

(52) U.S. Cl.
  CPC .............. *A63F 13/42* (2014.09); *A63F 13/92* (2014.09); *G01S 5/16* (2013.01); *G06F 3/0304* (2013.01); *G06F 3/011* (2013.01)

(56) References Cited

U.S. PATENT DOCUMENTS

| | | | |
|---|---|---|---|
| 8,921,752 | B2 | 12/2014 | Iizuka |
| 9,930,199 | B1* | 3/2018 | Matsui ................... H04N 1/401 |
| 10,235,596 | B2* | 3/2019 | Hong ................... G06K 9/4661 |
| 2001/0041007 | A1* | 11/2001 | Aoki ........................ G06K 9/46 |
| | | | 382/190 |
| 2007/0132785 | A1 | 6/2007 | Ebersole, Jr. et al. |
| 2011/0074983 | A1* | 3/2011 | Bush ................. H04N 5/37452 |
| | | | 348/241 |
| 2012/0173347 | A1* | 7/2012 | De Almeida Neves ..................... |
| | | | G06K 7/10722 |
| | | | 705/16 |
| 2012/0249802 | A1* | 10/2012 | Taylor ..................... G06T 7/292 |
| | | | 348/169 |
| 2013/0075464 | A1* | 3/2013 | Van Horn ........ G06K 19/06028 |
| | | | 235/375 |
| 2014/0228124 | A1* | 8/2014 | Plagge .................... G01S 17/46 |
| | | | 463/39 |
| 2015/0050994 | A1 | 2/2015 | Mangold et al. |
| 2015/0080071 | A1 | 3/2015 | Eyal |
| 2015/0220114 | A1* | 8/2015 | Reznik .................... H04M 1/04 |
| | | | 361/679.55 |
| 2016/0124074 | A1* | 5/2016 | Wonneberger .......... G01S 5/163 |
| | | | 356/4.01 |
| 2016/0228770 | A1 | 8/2016 | Hall |
| 2017/0147165 | A1* | 5/2017 | Kim .................... G06F 3/04842 |
| 2017/0209789 | A1 | 7/2017 | Ferrazzino et al. |

FOREIGN PATENT DOCUMENTS

| | | |
|---|---|---|
| JP | 2007/060093 A | 3/2007 |
| JP | 2009/139317 A | 6/2009 |
| JP | 2013/077088 A | 4/2013 |
| WO | WO-2009/153557 A1 | 12/2009 |

OTHER PUBLICATIONS

Japanese Office Action for 2019-546113, dated May 28, 2021, 6 pages.

\* cited by examiner

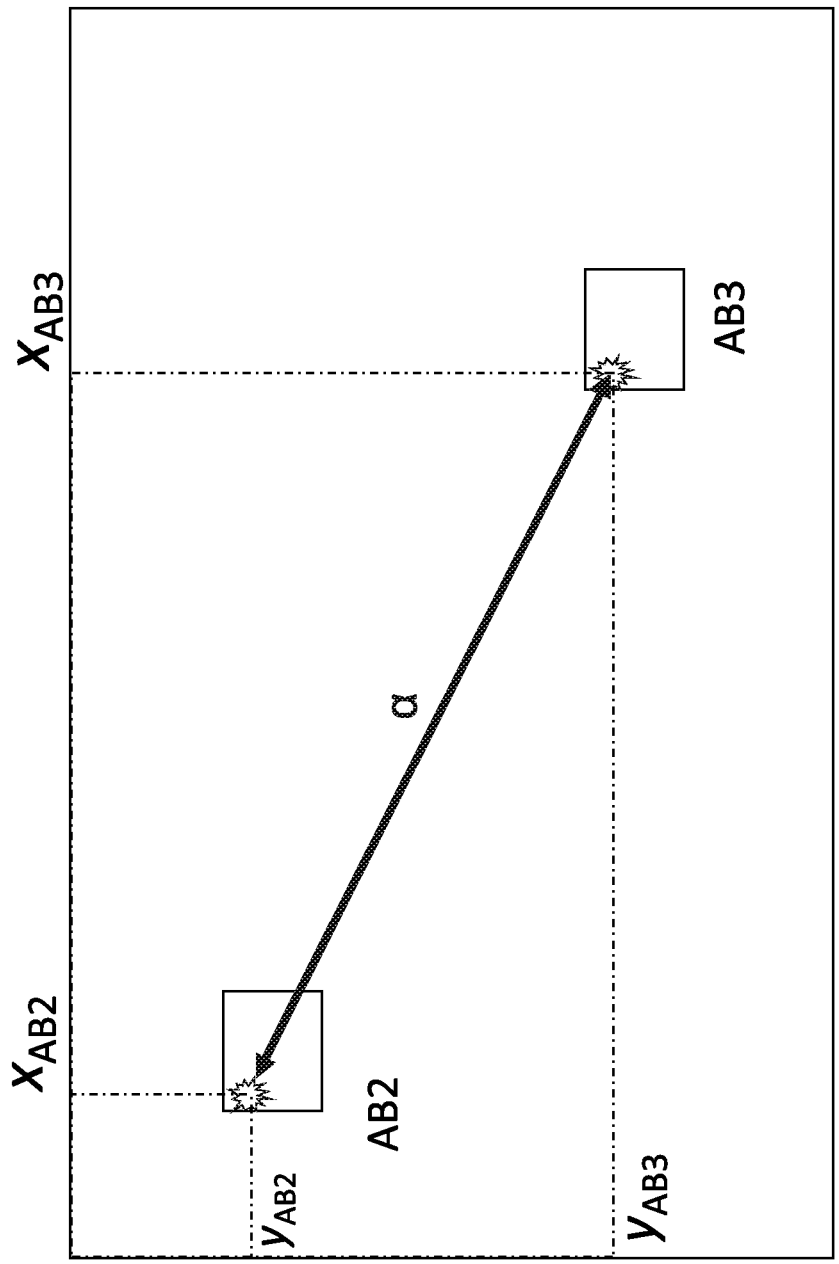

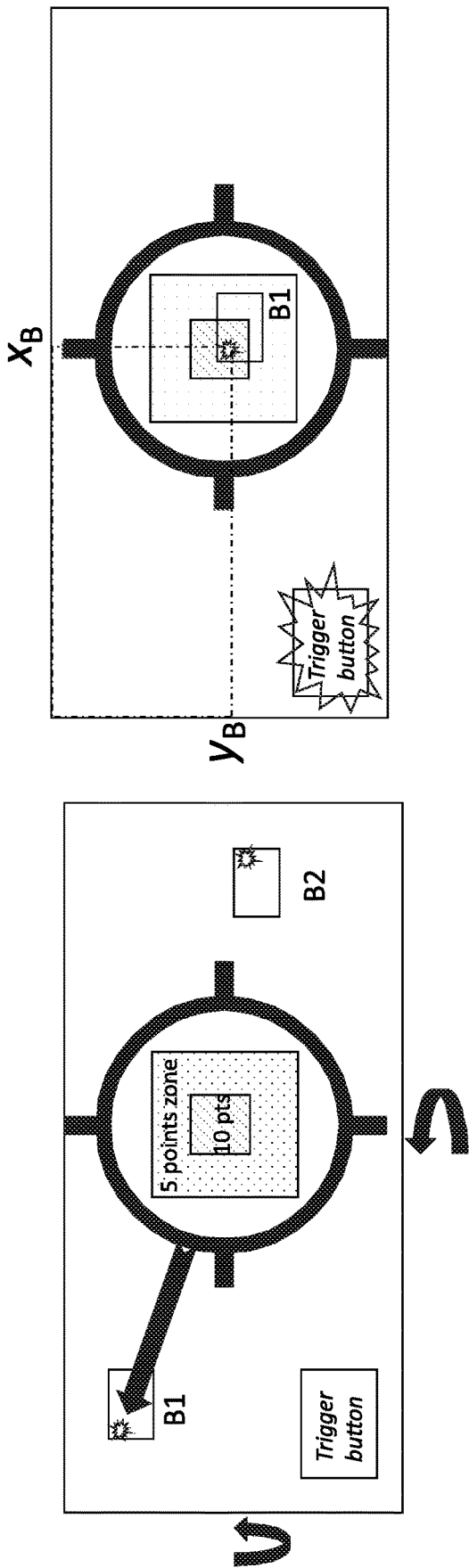

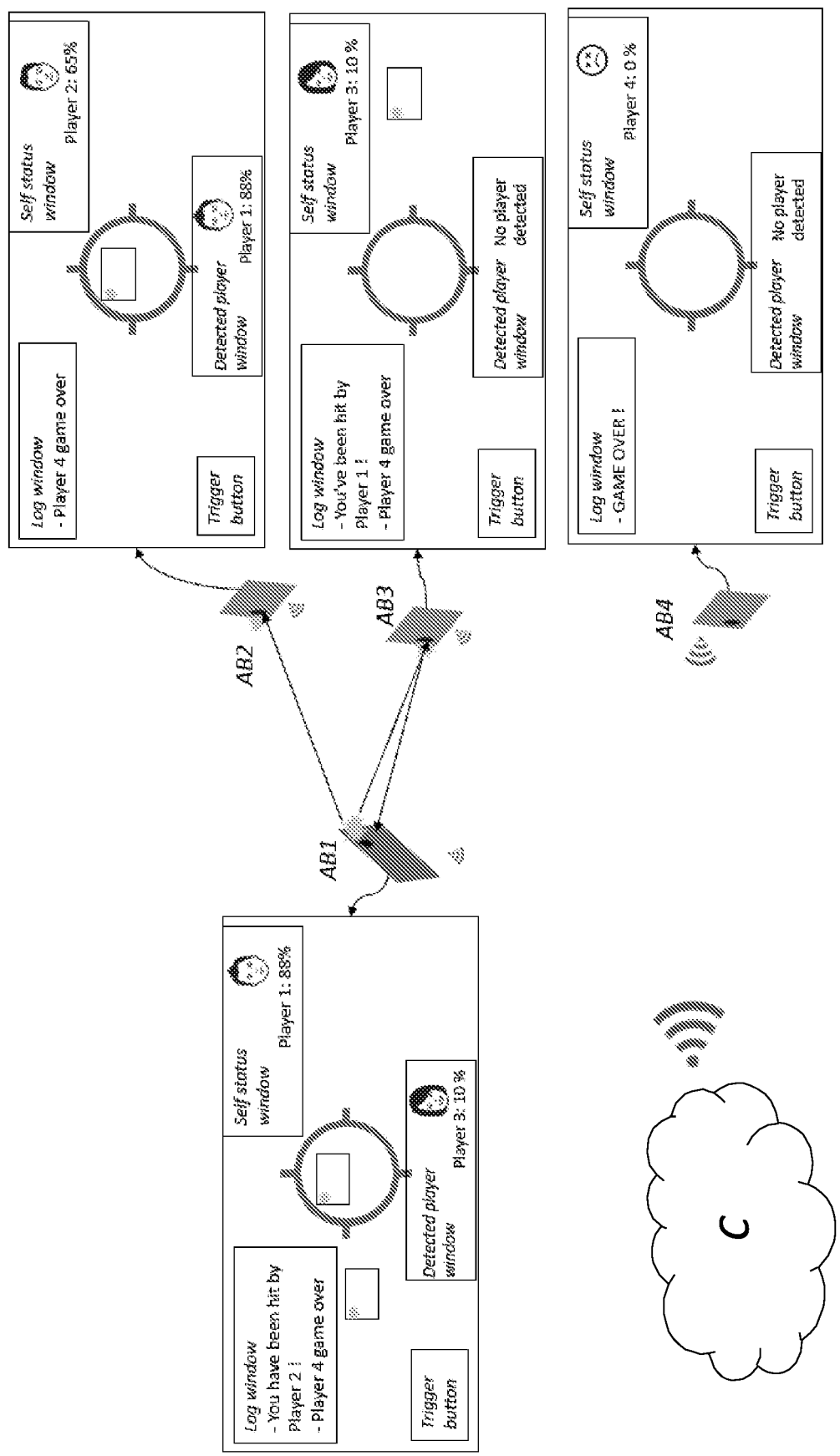

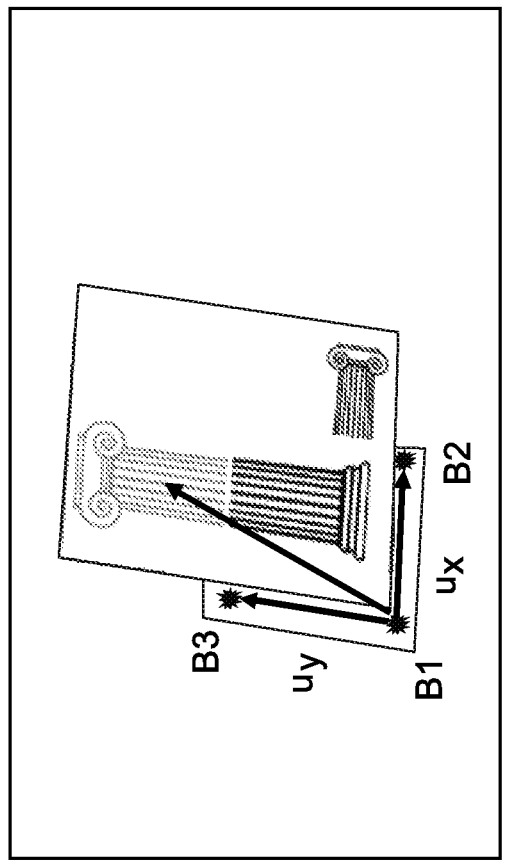
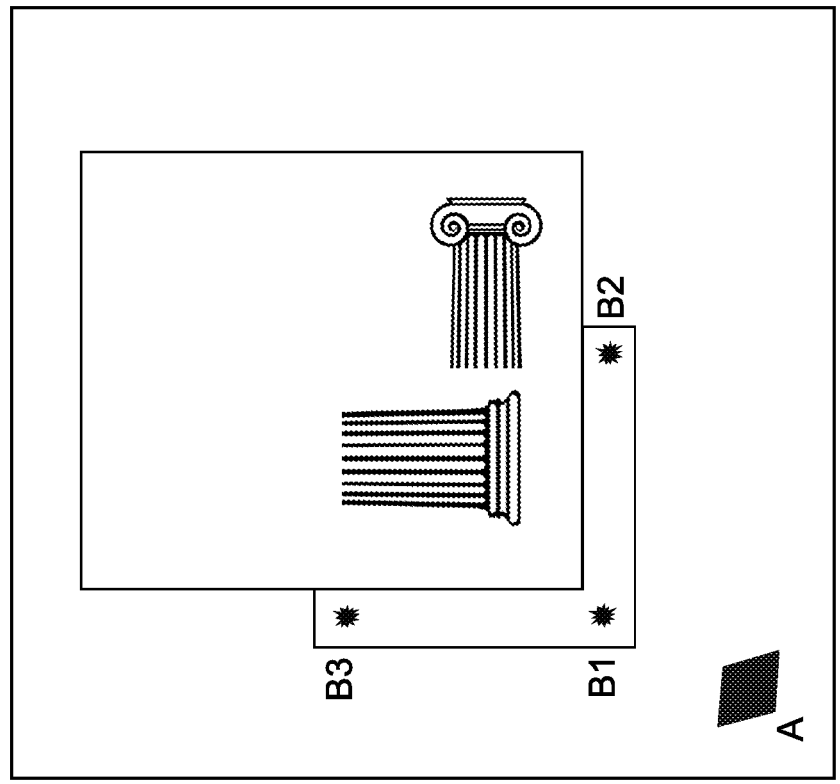
Fig. 21

METHOD AND APPARATUS FOR DETECTION OF LIGHT-MODULATED SIGNALS IN A VIDEO STREAM

RELATED APPLICATIONS

This application is a national phase of PCT/IB2017/056759, filed on Oct. 31, 2017, which claims the benefit of Swiss Application No. 01456/16, filed on Oct. 31, 2016. The entire contents of these applications are hereby incorporated by reference.

FIELD OF THE INVENTION

The present invention concerns a method for the detection and/or tracking of a light-modulated signal in a video stream.

DESCRIPTION OF RELATED ART

Various methods based on computer vision for identifying and tracking objects in consecutive frames of a video signal are known in the prior art. As an example, WO2009153557A1 relates to a method and system for enabling the tagging of items appearing in a moving or paused image by providing an identification device within the item to be tagged; capturing moving image footage containing the image of this item; detecting the presence and the position of the identification means within each frame of the moving image footage and hence determining the position of the item in each frame of the moving image. By automatically determining the position of the identification device, a suitable tag can then be automatically associated with the item when saving or transmitting the moving image. This method requires a specific identification device.

JP2003348424 describes the use of IR lights for video tracking.

FR2911707 describes a method for evaluating the position and orientation of an object to be monitored in an image. However, the detection of orientation is only possible for relatively large objects; the orientation of small objects, such as single pixels, or circular objects, is much more difficult or even impossible to determine.

US2015050994 describes a method based on a light signal for communication between mobile devices. The position of each pixel is not detected.

None of those methods is suitable for identifying and locating first mobile devices with second mobile devices, especially from a relatively large distance and when the first devices only appear as tiny objects or single pixels on the display of the second device.

According to another aspect, immersive computer games simulating firearms are already known in the prior art. As an example, US2007132785 describes a game system comprising head-mounted display systems and positional tracking equipment to create immersive augmented reality games. The cost and weight of such an equipment are important.

US20150080071 describes a software application for portable computing devices adapted to simulate a weapon combat. A camera is used to display images onto a display screen of the computing device. The image may be modified based on a set of predefined criteria. The predefined criteria may vary based on a virtual weapon being used, environmental conditions, and other factors. Responsive to user input, the current image is captured. The time of the image capture, the geographic location of the user, and identification of the enemy depicted in the image are transmitted along with the image to a centralized server. The time stamp of each transmitted image is analysed to confirm that the user had not been eliminated prior to capturing the image. Explosives are simulated by using the GPS to determine the location of the explosion and the damage radius. In this system, the identification of the opponents shot is done manually; upon firing a series of shot, a user examines shot photographs to visually confirm that a member of the opponent team has been hit. This identification is tedious, and could only be done after a delay, so that a participant in a duel does not know immediately if he has been hit.

US2016228770 describes a similar game based on geolocation.

US2017209789A describes a multi-user augmented reality laser game on mobile phones based on an external hardware equipped with a collimated IR light (to aim at another of such device) and with an array of 6 photodiodes to detect the incoming light beam of another of such devices.

In such a video game, it would be desirable to detect automatically if an opponent is present on an image or video captured by the mobile equipment of a player.

In another field of use, geomatic applications often require a determination of the positions of items, such as mobile devices, in a scene in order to evaluate dimensions or distances.

In yet another field of use, devices capable of autonomous navigation often require determining the position, identity and/or intentions of other devices of the same type, or to determine their position relatively to a frame of reference.

BRIEF SUMMARY OF THE INVENTION

Therefore, an aim of the present invention is to provide a method and a device for the detection and identification of a first device [the emitter device or device B in this text] in an image frame captured with a camera of a second mobile device [called receiver device or device A in this text] equipped with a camera.

According to one aspect, this aim is achieved by a method for detection and identification of an emitting device equipped with a light by a receiving mobile device equipped with a camera, comprising:

the emitting device emits a light-modulated identification signal to advertise its identity;

the receiving mobile device captures a series of frames with said camera;

the modulated signal is detected from said frames;

the pixel position of the emitting device within the camera frame of the second mobile device is detected.

The emitting device might be a mobile device.

According to another aspect, the invention is also related to a method for advertising the identity of an emitter device equipped with a light, comprising:

the emitter device emits a light-modulated identification signal to advertise its identity.

According to another aspect, the invention is also related to a method for identifying an emitter device, comprising:

capturing an image with a receiver mobile device;

detecting a modulated light source in said image or in a region of interest of said image;

identifying said emitter device if the modulation corresponds to said emitter mobile device.

Generally, the invention is related to a way for a device equipped with a camera to track the pixel position of another device (more precisely of a light installed on it), which is achieved by having the detected device emit a light signal (visible or invisible such as infrared) that is known to the tracking device—or rather, a signal that belongs to a set of signals known by the tracking device.

The invention is also related to a method allowing to find a known signal (even the signal it is weak and buried in noise) by searching through the intensity history for a number of previously acquired frames and doing so on all pixels of a region of interest.

In this invention, the primary goal of the light signal is not to communicate a stream of information. In this, it differs from visual or IR light communication (such as optical wireless communication or Li-Fi) using typically digital encoding, as per definition a signal used for communication cannot be known by the receiver (and the more information is communicated through a signal, the harder it is to isolate the signal from the noise). However, some information may be conveyed by the fact that the device to be detected may choose to emit through one or another known signal of a set, which allows a device to communicate a state that has been associated to a specific signal.

There may be as many devices emitting each a different light signal as there are signals in the set, and consequently, if the detecting device knows which emitting device is using which channel, the detection of a signal at a pixel position corresponds to the unambiguous detection of a device at this pixel.

The invention is also related to the detection of a device at a pixel position in combination with wireless communication, through which the devices may exchange information efficiently and at high rate (including the pairing information of which device is using which signal).

Once a detected pixel is associated with a device, this pixel may be in turn associated by any information communicated with the detected device.

Invisible light (such as infrared light) may be used to avoid the discomfort of seeing blinking lights, faster detection may be achieved by using high-speed cameras, and even higher sensitivity by using a monochromatic light and camera.

A wavelength that is less affected by the absorption by atmospheric vapor (or fog), and/or that is less overlapping the spectrum of the sun may be used (such as long wavelength infrared) in order to make the invention more immune to atmospheric conditions and more adapted to outdoor operation.

The invention is also related to the combination of detection—not only with wireless communication, but also with the geolocation capabilities of a device and the possibility access to a server. This enables applications in augmented reality such as a multi-user augmented reality aiming game.

On a smartphone or smartglasses, the light emitting the signal may be the camera flash LED or a dedicated IR light.

In one embodiment, this invention is further related to a guidance system for self-navigating devices such as car or drones, which benefit from the ability to detect but also identify unambiguously another of such devices.

In one embodiment, the method of the invention also enables a car to associate unambiguously information received through wireless vehicular ad-hoc networks (VANETs) to a specific car in the field of view of its cameras.

The device and method of the invention do not require a collimated light; instead, it may use an omnidirectional light which is commonly available in many mobile devices.

According to one aspect, the receiver device that is aiming to track can add an augmented reality mark at the position of the detected emitter device and distinguish between different emitters, such as different opponents in a game. This is even possible before actual shooting, and even if the receiver device aims somewhere else.

BRIEF DESCRIPTION OF THE DRAWINGS

The invention will be better understood with the aid of the description of embodiments given by way of example and illustrated by the figures, in which:

FIG. 6 shows an example of display view of the receiver mobile device A in the embodiment of FIG. 5.

FIG. 7 shows two successive images on a display of a receiver mobile device, in an example of application for an augmented reality aiming game.

FIG. 8 shows a schematic view of a session of four mobile devices (emitters/receivers combined devices AB) in an example of multiplayer game based on the principle described in FIG. 7 with wireless exchange of information and access to a server or cloud C, and their display views.

FIG. 21 shows a schematic view representing on the left: a frame of reference formed by 3 devices B attached to a painting in the field of view of the camera of a device A, and on the right: the display of the device A showing an augmented reality view of the painting.

DETAILED DESCRIPTION OF POSSIBLE EMBODIMENTS OF THE INVENTION

Figure 1:
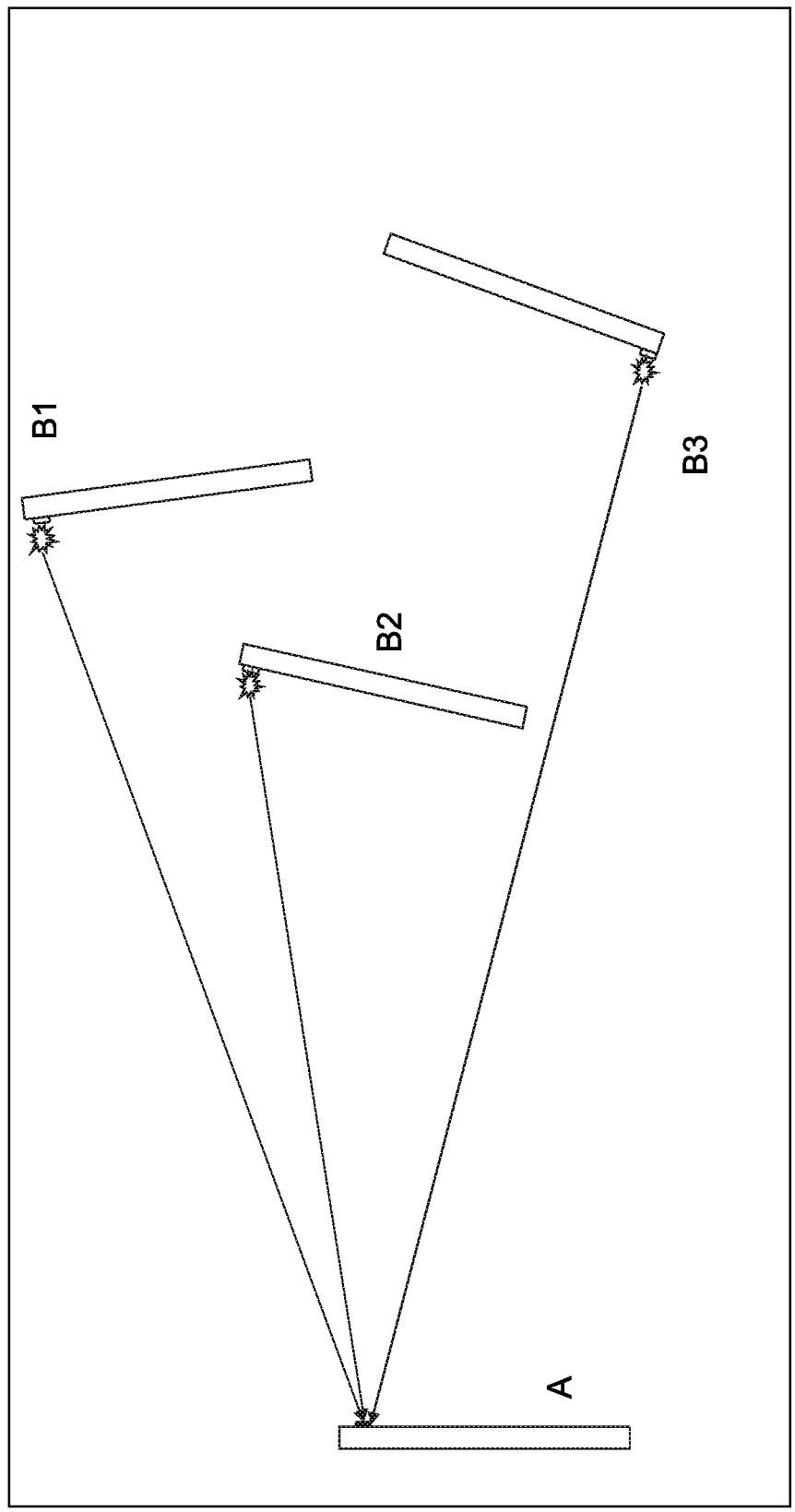
FIG. 1 shows a schematic view of a system comprising one receiver mobile device A and three emitter devices B, according to an embodiment of the invention.

FIG. 1 illustrates a system comprising one receiver device A, such as a receiver mobile device, and three emitter devices B, such as emitter mobile devices. The number of emitter devices B in the system may be any number equal or greater than 1; similarly, the number of receiver mobile devices A may be any number equal or greater than 1. The information interchanged during a dialogue between a set of devices A and B interacting in such a system and represented by arrows on the figure form what is defined as a session.

The receiver device (receiver A) is an electronic device equipped with a camera, it is typically portable and may be for example a smartphone, a tablet computer, a camera, a smartwatch, a video camera, an IR camera, a UV camera, a wearable device, a headset, a helmet, goggles, smartglasses (such as electronic glasses, a virtual/augmented/mixed reality headset, a head-mounted display or a virtual retinal display system), a robot, a drone, a car, etc. Its position might be mobile, although for some applications the receiver device might be fixed, or fixed during the detection.

Its camera may be sensitive to visible and/or non-visible light (such as IR or UV), and can detect a light-modulated signal emitted by an emitter mobile devices B within its angle of view. It may be equipped with a more than one camera in order to cover a wider angle (in this text reference to a camera may represent a group of cameras).

The emitter device B is an electronic device equipped with a light that is typically omnidirectional. It is typically portable and may be for example a smartphone, a tablet computer, a camera, a smartwatch, a video camera, a wearable device, a headset, goggles, electronic glasses, smartglasses, a lamp, a light, a flash, a helmet, a hat, a piece of cloth, a target, a robot, a drone, a car, a beacon attached to an object, etc. Its position might be mobile, although for some applications the emitter device might be fixed, or fixed during the emission.

In the case of a smartphone, the light may be for instance the LED flash of the camera.

FIG. 1 shows a plurality of emitter devices B1, B2, B3. Each emitter device B is equipped with a light of which the emission spectrum may be within or outside of the visible range (for instance, UV or IR). An emitter device B can comprise a plurality of components, such as for example a hat equipped with a light and a smartphone wirelessly connected with the hat. It may be equipped with a more than one light in order to cover a wider angle or improve the omnidirectionallity (in this text reference to a light may represent a group of lights).

The spectrum of the light of emitter device B must overlap the spectral sensitivity range of the camera of receiver device A. The camera of receiver device A may be monochromatic or equipped with a bandpass optical filter matched to the spectrum of the light emitted by the device B (which may increase detection sensitivity by decreasing the noise coming from the rest of the spectrum). The light of emitter device B may be monochromatic, for instance using a LED or by equipping it with a bandpass optical filter. The light of emitter device B may be in the visible spectrum or in the infrared spectrum. The light may be emitted from the backside of a smartphone, and captured by a camera in the backside of another smartphone.

Each or some of the receiver devices A and each or some of the emitter devices B may be equipped with a processor and/or with a display. It may be equipped with a geolocation system, and/or wireless data communications systems that allow it to communicate wirelessly with other devices in the system and/or with a server or cloud (C in this text). A device that may act as an emitter and a receiver is defined as a combined device or device AB in this text.

Each emitter mobile device B emits a light-modulated signal that creates a channel S. The signal is chosen among a set of signals that can be reliably and specifically detected by the device A. The set of signals may be a finite set.

The channel may be defined by simple square signal at a specific frequency (which correspond to the blinking of the light at a given frequency) or a sinusoid. If the devices share a time base (for instance they may communicate a clock signal with each other wirelessly, or they may use timestamps obtained from a GPS signal or from a cellular network), the phase information may also be used to define the channel in addition to the frequency, and the signal may be controlled via a phase-locked loop. Other modulations may be used, including frequency modulation, phase modulation, amplitude modulation, and discrete or analogic modulation schemes. Using more elaborate modulations allows a higher number of channels available, more reliable detection of each channel, and hence for example a more reliable identification of each emitter device it is paired to, especially in difficult light conditions.

Different kind of transforms or functions may be used for detecting blinking portions in a captured image and associating them with a specific channel. For instance, the algorithm may be based on the discrete Fourier transform or the autocorrelation function. It may also be based on phase-sensitive detection (or digital lock-in amplification). Alternatively, the algorithm might be based on a correlation between each signal which is searched and the detected variation of intensity signals at each pixel, or at each pixel or portion of a region of interest. The correlation between the searched signal end the signal detected at a particular position also gives a confidence value for the detection.

In order for a receiver mobile device A to proceed to the identification of an emitter mobile device B, each emitter device B uses preferably a different channel, so the receiver device A may specifically identify each of them. In order to proceed to the device identification, the device A must know which channel S is attributed to which devices B. This is what will be defined as channel-device pairing.

This pairing may be set before the session starts, or be communicated to the receiver devices A before, during or after the detection process. In one embodiment, an emitter device B may communicate itself which channel it is paired with to a receiver device A, for instance wirelessly. In another embodiment, an instance (with computing power and that is able to communicate data with the devices A or B) defined as the session host may attribute a channel to each device B and communicate channel-device pairing to each device A, for instance wirelessly. One of the mobile device A, or B, or an external instance (such as a server or cloud C) may be used as this session host.

Wireless communication may be achieved via wireless personal area network (WPAN, such as Bluetooth), wireless local area network (WLAN such as Wi-Fi), peer-to-peer Wi-Fi, mobile/vehicular/smartphones ad hoc networks (MANET/VANET/SPAN), wireless mobile telecommunications technology (from instance through cellular network such as GSM or UMTS), and/or through a computer information network (C/N such as the Internet), etc.

Several emitter devices may use the same channel and still be identified if it is possible for the receiver mobile device A to distinguish them with other elements, for example based on the time of emission, on the location of the emitter device, and/or on the color (or wavelength) of the emitted light.

The information that may be associated with a channel is not limited to the identity of the device A. For instance, a channel (such as a blinking frequency, or another signal) may represent the state of a device B (in this case, there would be as many states possible as there are channels available). In this situation, more than one device B may advertise the same state in the same time, and each device B may change state over time. As described previously for identity, the channel-state pairing may be set before the session starts, or be set and communicated by the session host.

In addition to the modulation of the light signal, additional information may be used for distinguishing between mobile devices identified in an image, for instance if some of them use the same channel. For example, the aiming direction of the receiver device may be known, for example based on a magnetometer, inclinometer, accelerometer etc. If the geo-location of each device is also known, for example based on a global navigation Satellite system (GNSS, such as GPS, GLONASS, etc), an indoor positionning system (IPS, such as Wi-Fi positioning system), by triangulation based on a GSM or other wireless signal, and/or based on an inertial measurement unit (IMU), the aiming direction or the receiver device and the location of each emitter and receiver device may be used for disambiguating between two emitter devices, for example if they are using the same channel, and/or for limiting the search for emitter devices to areas in which they are more likely to be found. The devices may communicate their location information to each other wirelessly (directly or through a server or cloud C).

The light modulation may be used to carry additional information, for instance as a signal added to, multiplied to, convoluted to and/or alternating with the light-modulated signal defining the channel.

Let's consider an emitter mobile device B in the angle of view of the camera of a receiver mobile device A and which uses a channel S. The video stream captured by the camera of the receiver device A thus comprises blinking pixels at the position corresponding to the emitter devices B in one image, or in a plurality of image frames of a video stream. A processor in the receiver mobile device A, or in a server or cloud C accessible by this device, performs a signal recognition algorithm to find the pixel (or pixels) $(X_S, Y_S)$ corresponding to a channel S with highest probability, for each channel among the set (or a subset) of all available channels. The processor might also determine a parameter representing the detection confidence $d_s$. This recognition and/or determination may be performed in real time or in postprocessing, continuously or on-demand. The output values of the algorithm are hence the pixel (or pixels) position $(X_S, Y_S)$, the optional detection confidence $d_s$ and any other information that may be relevant. In the embodiment in which the device B is paired with the channel S, the device B is detected at position $(X_S, Y_S)$ with confidence $d_s$. Such a process running continuously in real-time allows for real-time tracking of device B within the camera frame of device A.

In one embodiment, the detection of blinking pixels is only performed on a subportion of the display defined as the region of interest (ROI), for example on a rectangular or quasi-circular portion of interest selected or targeted by the user of the receiver mobile device A. The region of interest can extend to the full frame. In one embodiment, a device is equipped with a touch sensitive display and the ROI may be defined by user action on said display.

In another embodiment, the display is divided into an array of subportions and the signal recognition algorithm is run parallely on all (or a subset of, such as a user selected subset of) the subportions, for instance by running all or part of the algorithm on the main processor or preferably on a graphics processor unit (GPU).

Figure 14:
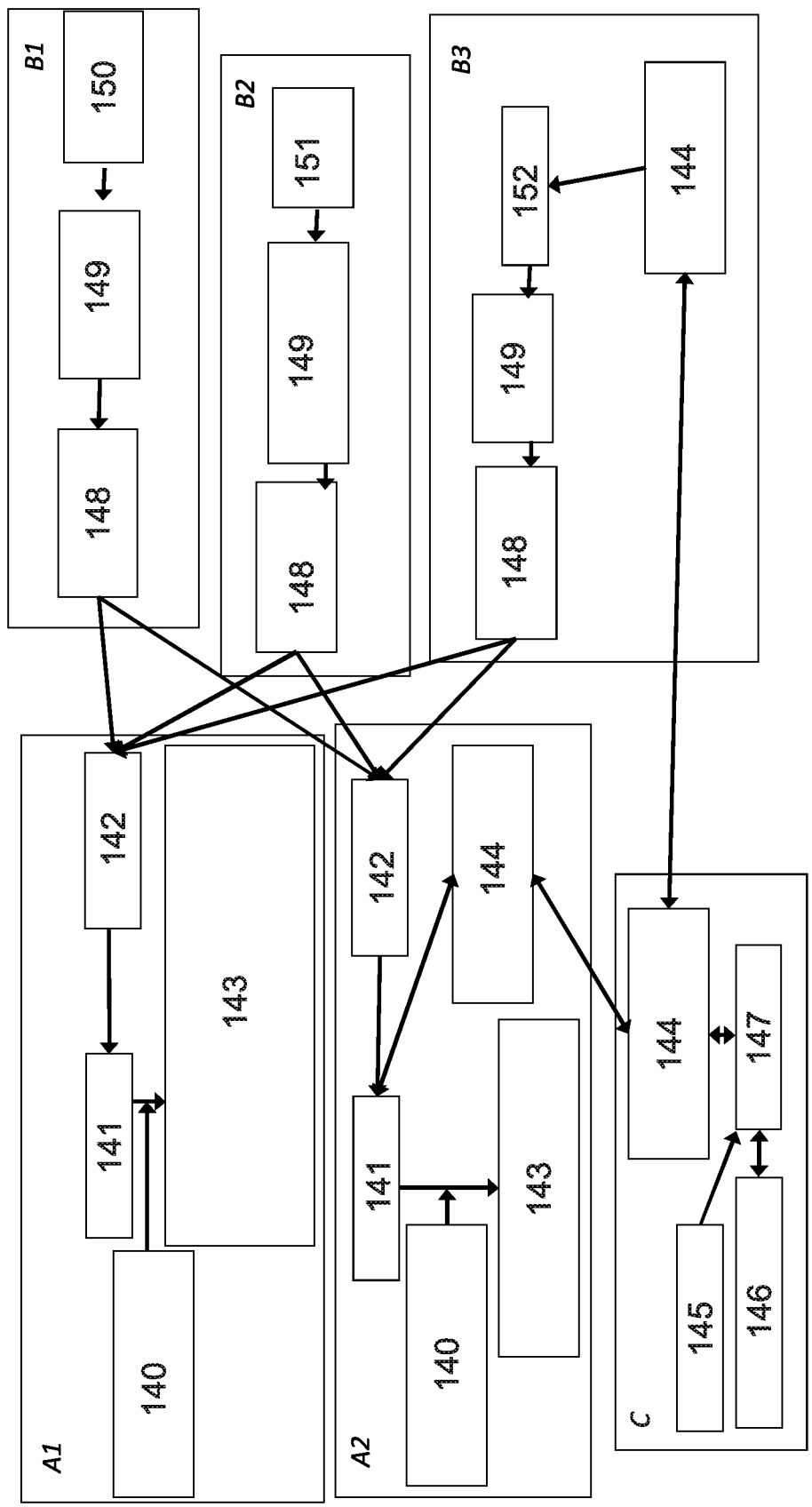
FIG. 14 shows a system flowchart of a session of receiver devices A and emitter devices B interacting with each other, according to an embodiment of the invention.

An embodiment of a session of various emitter mobile devices B and receiver mobile devices A is represented in the system flowchart of FIG. 14. The figure shows two receiving devices A1 and A2, and three emitting devices B1, B2 and B3. Each receiving device A1, A2 comprises one software module 140 for channel device pairing, executed by a processor or graphic processor 141, and a camera 142. It delivers an output information 143 in the form of a position X,Y of each detected device in each frame. A global data communication module 144, such as a cellular part, might be provided to exchange data.

Each emitting device B1, B2, B3 comprises a light emitter 148, such as a LED, for emitting light in a channel S1, S2 resp S3 corresponding to the device. The different channels might be modulated differently so that the receiving devices A1, A2 can distinguish them; for example, the light might be pulsed with different frequencies, phases and/or duty cycles depending on the channel. The lights are controlled by a control electronic circuit 149, depending on a channel selection stored in a memory 151 or channel selector 150. A processor 152 might be provided in at least some of the emitting devices. The emitting devices might have a global data communication module 144 that can be used to get the information about which channel to use from the session host (for instance the server).

A server or cloud S may control the system. It comprises a global data communication module 144, a processor 147, a data storage 146 and may perform the task of hosting the session (145).

In one embodiment of a signal recognition algorithm, every N frame, the processor 141 in the receiver device A, and/or a processor 147 in a server or cloud C accessible by the receiver mobile device A, cyclically performs a signal recognition algorithm on the intensity for the last N frames for all pixels within a region of interest, in order to determine the pixel (or pixels) ($X_S$, $Y_S$) corresponding to strongest signal for channel S and a detection confidence parameter $d_s$. Such a detection process is represented in the process flowchart of FIG. 12

The process starts at step 120 with the acquisition of a video by a camera 142 of one receiving device A. A matrix is initialized to store video data, i.e., a series of frames.

At step 121, a counter is initialized.

At step 122, one video frame is grabbed from the video stream that was captured.

At step 123, this frame is pre-processed, for example in order to adapt its brightness or contrast, convert it from color to grayscale, crop and/or rescale it. Frame data is added to the matrix.

A check is performed at step 125 for the value in the counter. If the value is lower than the required number of frames N, the counter is incremented and the method returns to step 122. Otherwise, the process goes to step 126 where a signal recognition algorithm is performed on the matrix.

At step 127, the signal recognition algorithm outputs the pixel (or pixels) position ($X_s$, $Y_s$) where the channel S was recognised in the retrieved frames, as well as a detection confidence parameter $d_s$ (step 128) for each detected pixel position, that may for instance depend on the contrast between those pixels and neighbour pixels in the scene. The process is repeated for each channel S (step 129).

At step 130, the following channel detection information is output for each channel found in the frames: Pixel (or pixels) position ($X_s$, $Y_s$) where channel S was recognised, and detection confidence $d_s$.

At step 131, a pairing between the found channels (found blinking frequencies) and emitting devices B is performed, based on previously known data or data communicated by the session host.

At step 132, the following information is determined for each found emitting device: most probable pixel (or pixels) position ($X_S$, $Y_S$), and the corresponding detection confidence $d_s$. This information is updated at each cycle of N frames, allowing the device A to track each device B having its light in the field of view of the camera.

At step 133, a postprocessing of the channel detection might be performed, for example in order to generate an augmented reality view.

Figure 2:
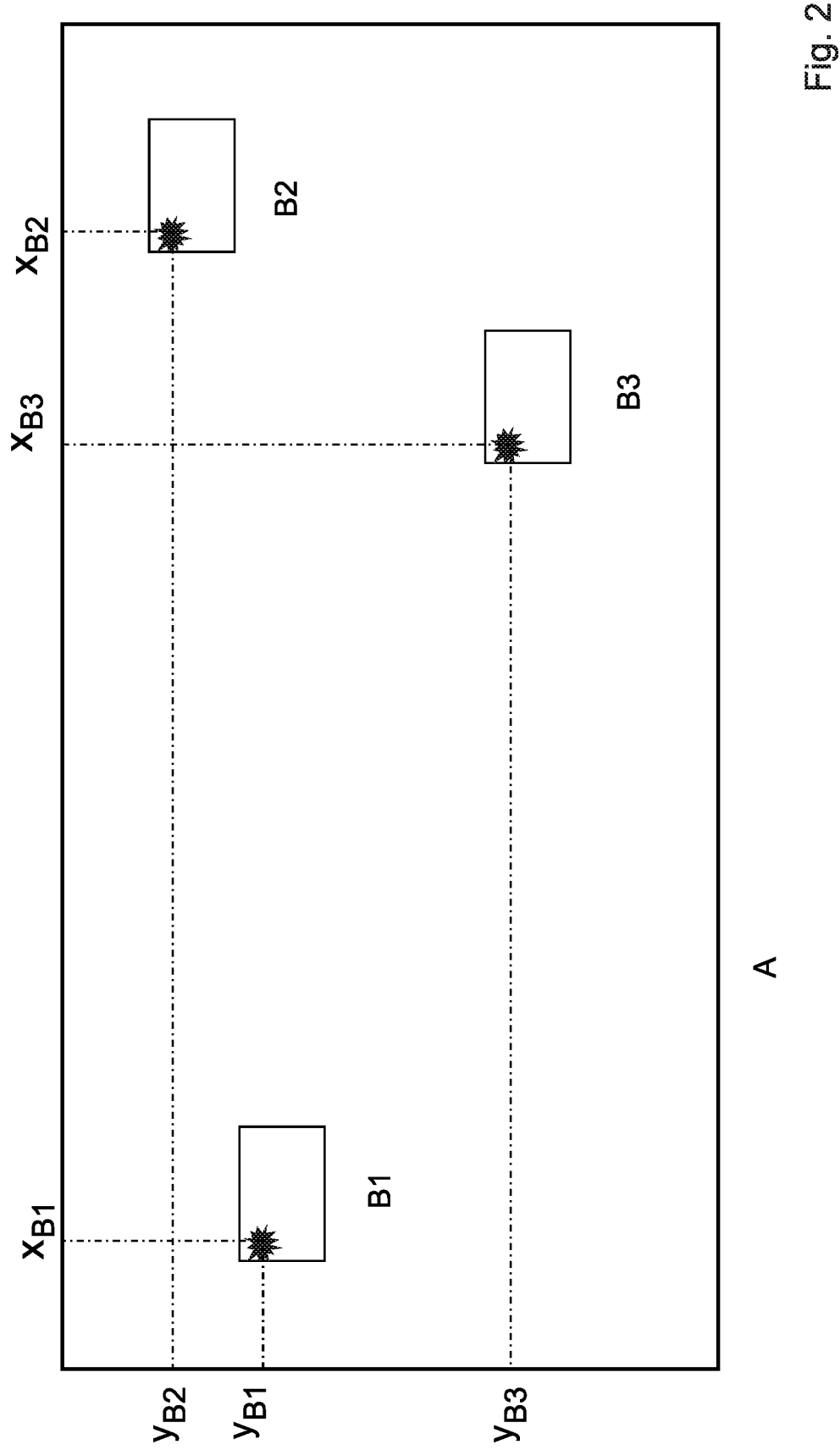
FIG. 2 represents an image frame of the camera of a receiver mobile device A, displaying a plurality of emitter devices B.

FIG. 2 represents one frame acquired by the camera of the receiver mobile A having three emitter mobile devices B1, B2 and B3 in its field of view. Each emitter device uses respectively a channel S1, S2, S3 (they emit a light-modulated signal with a specific modulation). The position of an emitting device Bi in the frame is represented with coordinates $X_{Bi}$, $Y_{Bi}$.

Figure 3:
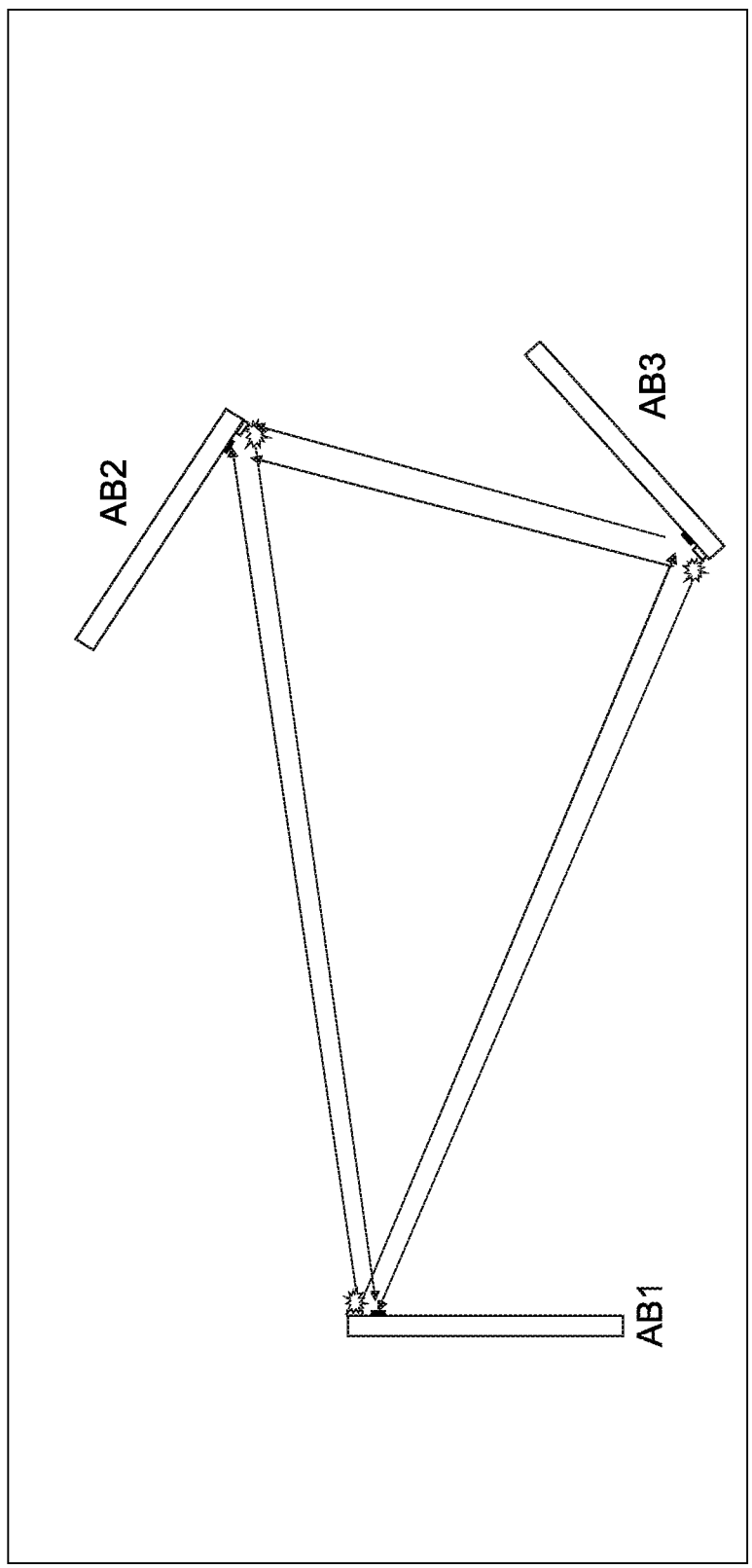
FIG. 3 shows a schematic view of a system comprising four mobile devices all acting as emitter and as receiver mobile devices (combined device AB).

As illustrated on FIG. 3, a combined mobile device AB may be equipped simultaneously with a camera 142 and with a light 148 and act simultaneously, or at different times, as emitter and receiver device AB. FIG. 3 represents three of such devices. Such kind of devices may detect other emitter devices B or combined devices AB, and may be detected by other receiver devices A or combined devices AB. The system is thus reciprocal for combined devices AB. In one embodiment, only some of the mobile devices are combined devices AB equipped with both camera and light, others are receiver devices A equipped with a camera only or emitter mobiles B that just emit a light and serve as passive targets or beacons. An embodiment of a session of combined devices AB is represented in the system flowchart of FIG. 15.

Figure 4:
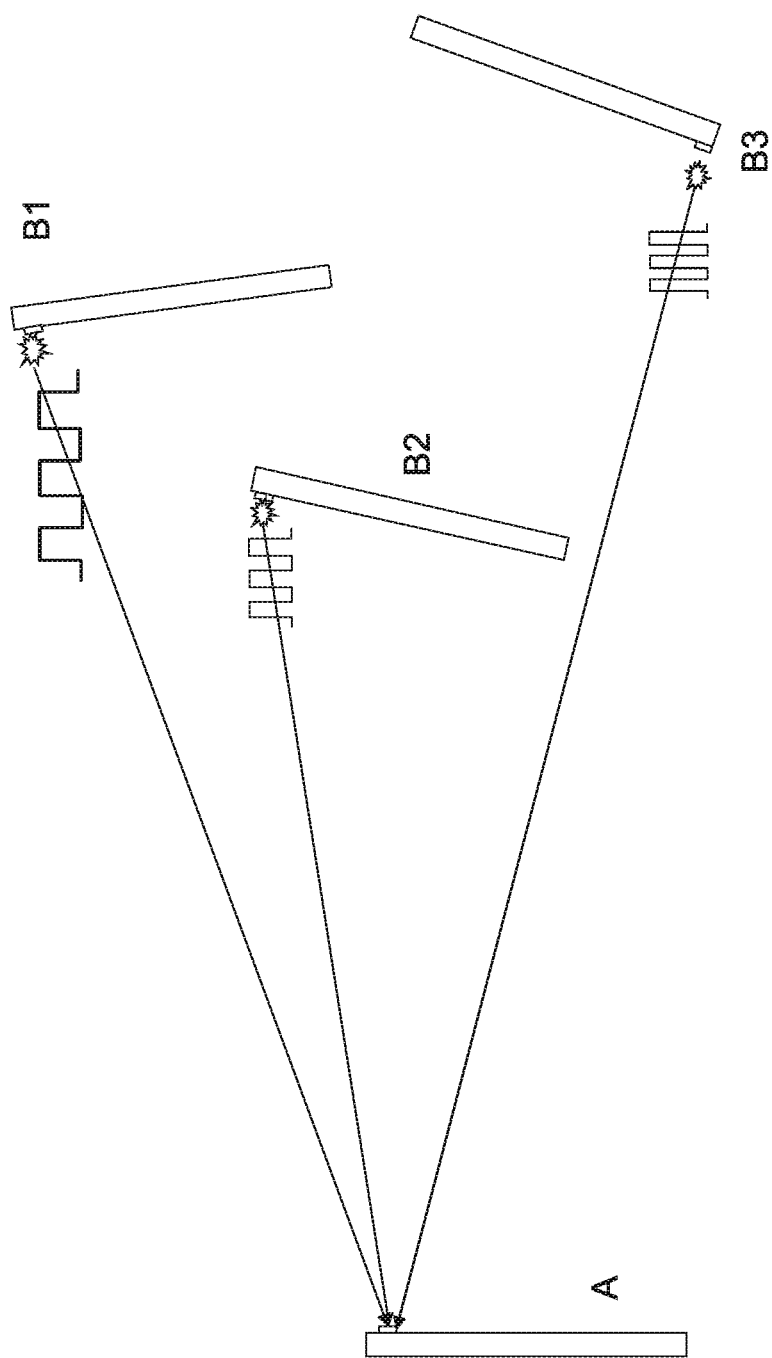
FIG. 4 shows a possible implementation of a light-modulated signal and signal recognition algorithm in the system of FIG. 1

FIG. 4 illustrates a possible implementation of a light-modulated signal and signal recognition algorithm. Each emitter mobile device B1, B2, B3 blinks at a specific frequency $f_{Bi}$. The receiver mobile device A uses a discrete Fourier algorithm, or another transform or function, to detect blinking pixels or regions in successive frames acquired at a constant frame rate, and to identify the corresponding emitting device. The frequency may be for example comprised between 1 and 1000 Hz, in relation to the number of frames acquired per cycle and the frame rate.

In this example, the emitted light-modulated signal used as a channel S is a square signal at a specific frequency $f_S$ for each mobile device B. The recognition algorithm in the reciever mobile device or in a remote server or cloud is based in this example on a Discrete Fourier Transform (DFT) on pixel intensity for the last N frames, on all pixels. The number N may be for example comprised between 16 and 256, for example 32 or 64, and the frequency $f_S$ a multiple of the ratio of the frame rate to N. Each pixel or group of pixels emitting at a given frequency generates a peak in the absolute value of the discrete Fourier transform (DFT) for this specific frequency. The algorithm searches for the pixel ($X_S$,$Y_S$) having the highest probability of presence of a light-modulated signal corresponding to the channel S, i.e. highest absolute value of DFT frequency corresponding to a searched channel. This might be for example the pixel emitting a light-modulated signal with the highest brightness value, or maximum brightness value in a wavelength range. If for instance the number N is set to 32 and the camera acquires 60 frames per seconds, the duration of a detection cycle is circa half a second. Using a high-speed camera acquiring at 1000 frames per second, the duration of a detection cycle is reduced to 32 milliseconds.

In this example, the detection confidence $d_s$ takes the value 1 if the absolute value of the DFT at pixel (Xs, Ys) is higher than a predefined (or adaptative) detection threshold, else it takes the value 0 (in this example $d_S$ is a Boolean value; confidence level with more than two different possible values might also be used). Similarly, this search may be done for other channels according to their frequency.

If the channel-device pairing is known, each channel can be related to the device it is attributed to.

Figure 12:
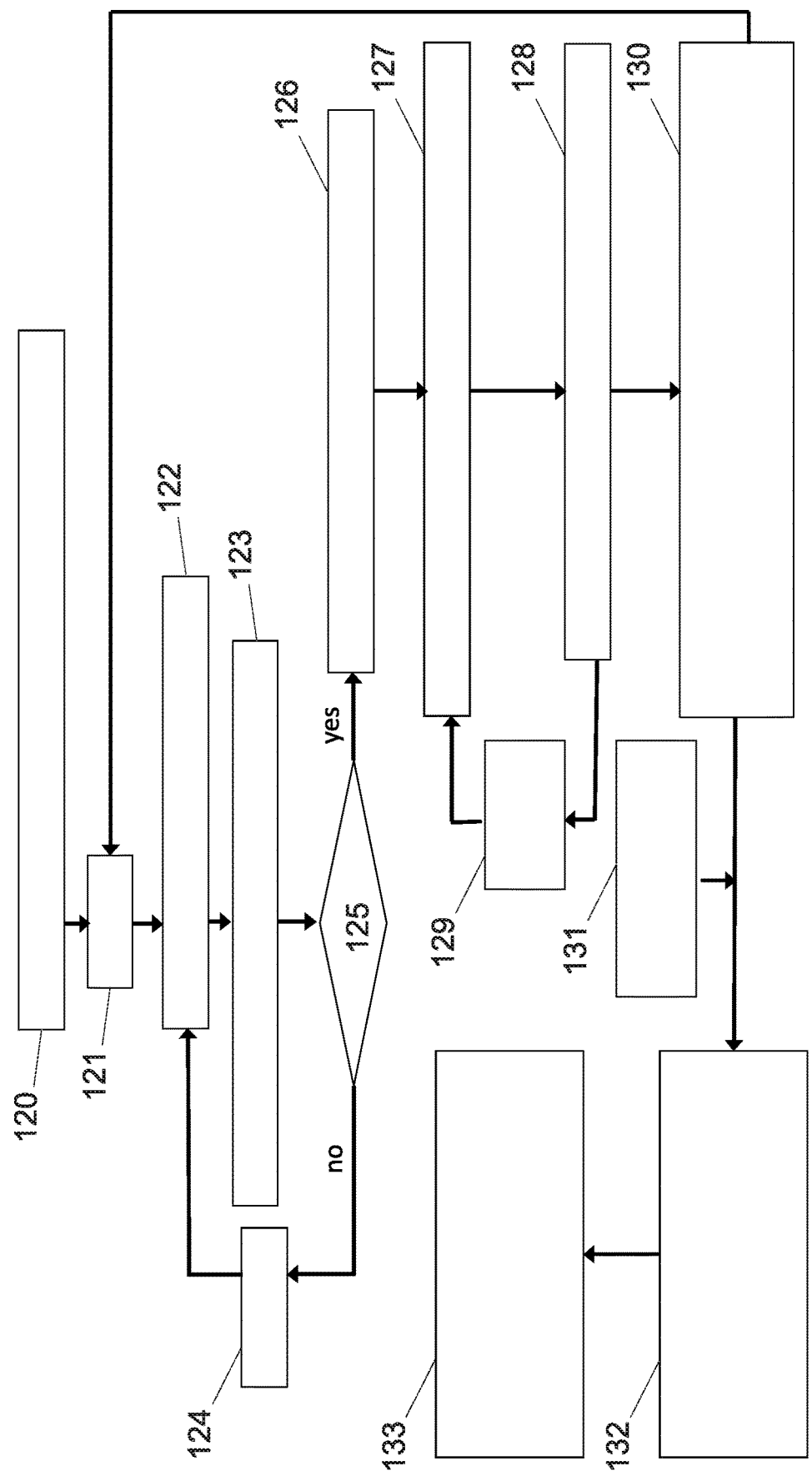
FIG. 12 shows a process flowchart representing a cyclic detection algorithm, according to an embodiment of the invention.
Figure 13:
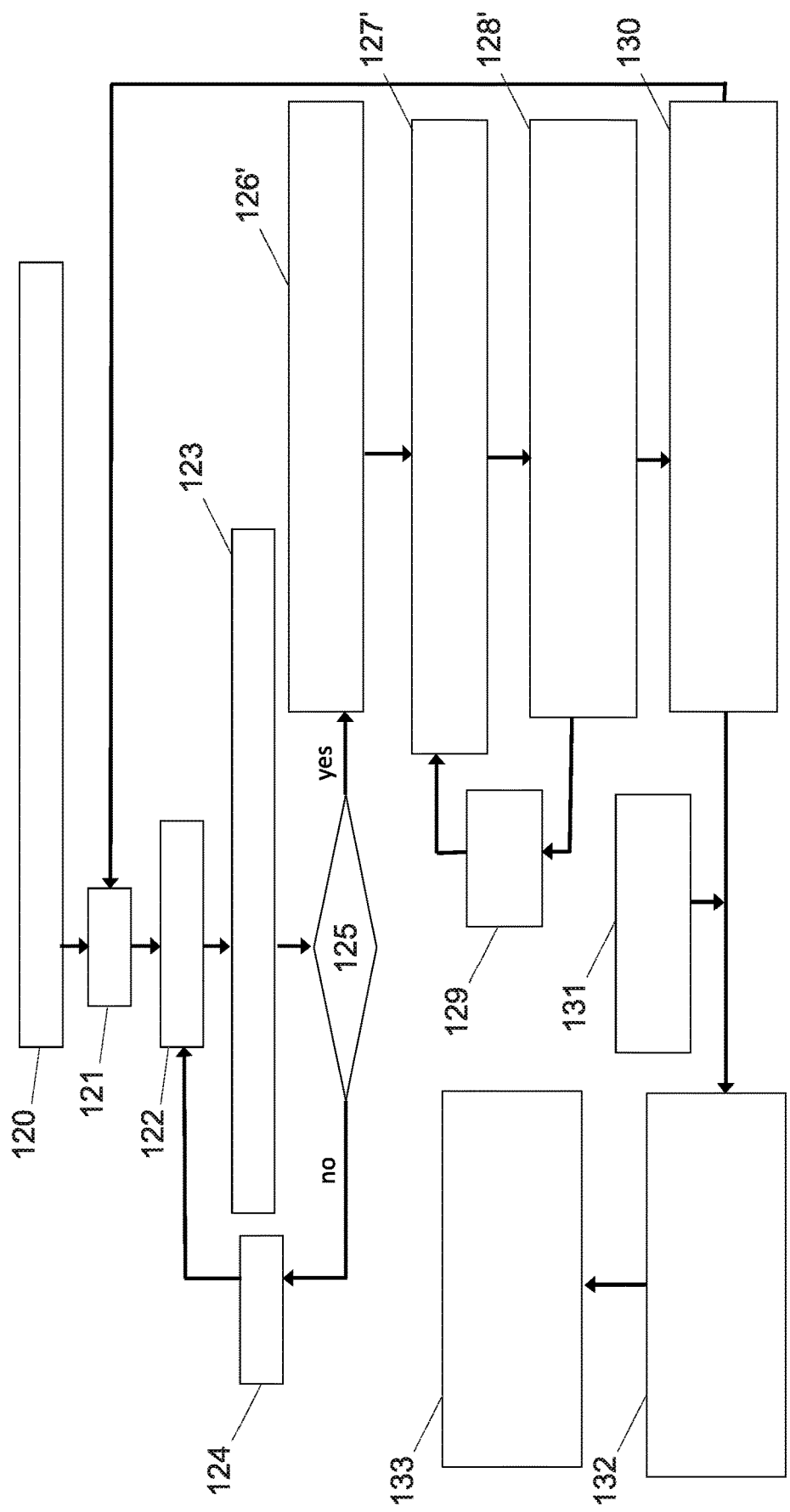
FIG. 13 shows a process flowchart representing a cyclic detection algorithm based on DFT for the detection of a light-modulated signal (as represented in FIG. 4), according to an embodiment of the invention.

The detection algorithm of this example is represented in the process flowchart of FIG. 13. Steps that are identical to those of FIG. 12 are indicated with the same reference number and won't be described again. At step 126', a discrete Fourier Transform (or another transform) is performed on the intensity for the N frames and for each pixel. At step 127', the pixels (Xs,Ys) with the maximal DFT value for each used frequency f (corresponding to a channel S) is found. A confidence level $d_s$ is then determined at step 128'. In this example, the confidence value $d_s$ is set at 1 if the maximal DFT value is above a predefined and adaptative threshold, otherwise this value ds is 0.

The detection is most likely to be successful, if the light-modulated signal of device B remain aligned with pixel ($X_S$,$Y_S$) for the whole duration of the detection cycle. The duration of the detection cycle may be decreased by increasing the number of frames per seconds acquired by the camera.

The value of the threshold may be adapted to the lighting conditions, and the adaptation may be done in real-time.

The detection process of a receiver mobile device A thus generates the pixel(s) position(s) ($X_S$,$Y_S$) which is most likely to correspond to a channel S as well as, preferably, a detection confidence $d_S$.

This information is available for postprocessing (step 133), for instance by the receiver mobile device A itself or a server or cloud C accessible by it, for instance to generate an augmented reality view of the scene. A mark (or an avatar, icon, . . . ) may be added to the scene for each detected position of channel S, and may be refreshed in real-time, continuously or on-demand (depending on the detection algorithm). The mark may represent a device B paired to the channel S, the user or owner of the device B, or the state paired to the channel S, or any property that may be associated with them in the context of an application software or a game. The augmented reality view may be for instance shown on a display, typically on emitter mobile device A itself. The video stream used for this augmented reality view is not necessarily coming from the camera, or the one used for the detection. The emission and detection of light modulated signal may occur in the invisible spectrum (for instance using IR light and an IR camera), and the video stream shown on screen (on which the augmented reality elements are added) may come from another video camera equipping the device A that is sensitive to visible light.

Figure 19:
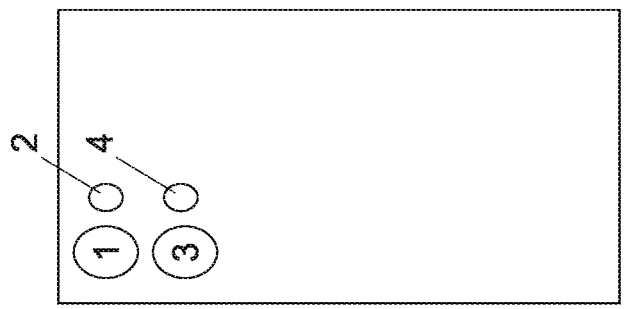
FIG. 19 shows a schematic view of an example of embodiments of a combined device AB as a smartphone equipped with a video camera, and a camera flash light.

As illustrated on FIG. 19, a combined AB device may be a smartphone that is equipped with a video camera 1, a light source (camera flash LED) 2, a camera 3 sensitive to IR light at the wavelength of the IR light source (such as an IR camera or a video camera without IR cutoff filter sensitive to IR light), and an IR light source 4. In this embodiment, the IR-sensitive camera is used for the detection of the pixel position of others AB (or B) devices in the field of view and the IR light source may be used for the emission of the modulated light signal (using a channel S). The video stream from the video camera can be shown on screen with augmented reality elements displayed where others AB (B) devices are detected. The use of a channel in the invisible IR light prevents the users to be disturbed by the blinking light.

Figure 20:
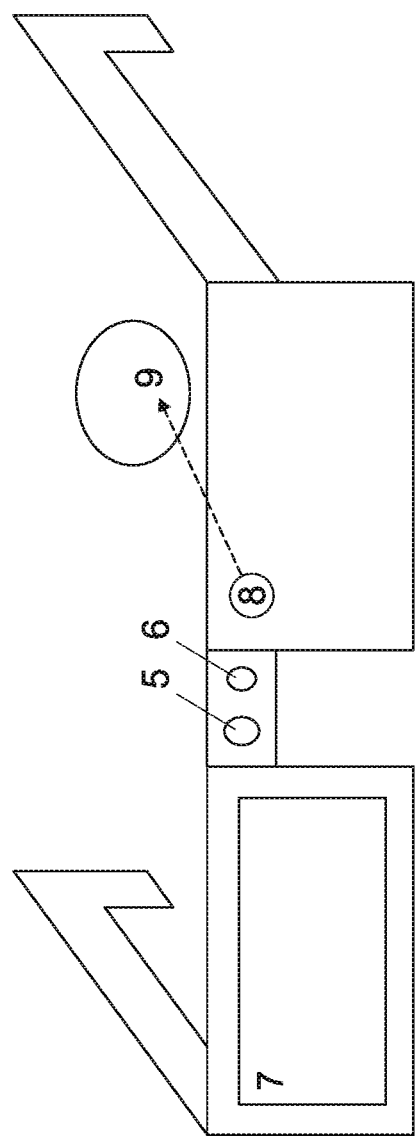
FIG. 20 shows a schematic view of another example of embodiment of a combined device AB as smartglasses equipped with an IR camera as device A and an IR light as device B.

Alternatively, as shown on FIG. 20, a combined AB device may be smartglasses equipped with an IR-sensitive camera 5, an IR light source 6, and a semi-transparent display 7 or a virtual retinal display 8 projecting light directly onto the user's retina 9. Augmented reality elements can be added on the user's field of view, for instance around detected devices B or AB.

The server or cloud C represents an external instance with computing power and data storage, that may be accessible by some or all of the emitter devices A, receiver devices B or combined devices AB in a session, for instance wirelessly. As described previously, it may act as the session host, perform part or all of the detection algorithm, and/or may collect geolocation data as well as other information from connected devices A, B and AB. If the server C is connected to a CIN (such as the Internet), it may collect information from other sources connected to the network, for instance a map server. It may perform computation task based on all the collected information, and send back information (including settings or tasks) to all connected devices of the session, for instance a map with updated location of the other connected devices. Connected receiver devices A, emitter devices B or combined devices AB may further process this information, for instance within the execution of a computer program, for instance in a game using the updated map.

FIG. 21 shows an application of the invention in which a reference device is made of a set of emitter devices B emitting on different channels (typically based on invisible light such as IR). The detected pixel position of the devices B by a receiver device A may form a frame of reference, according to which the device A may project an augmented reality element with contextual position, scaling and orientation on its screen (provided that the geometry of the reference device is known by device A). For instance, the reference device may be fixed to an object or in scene at specific location (such as an object in a museum, an historical site, or in the context of a geolocation-based game), and augmented reality content linked to it may be shown on receiver devices A.

In the case of a 2D-scene (such as a painting), the reference device may consist of 3 devices B, for example disposed in an L-shape. More than one of such reference devices may be used on the same site, as each of them may be specifically identified through the channels it is using (it is sufficient that the device B forming the origin of the reference device uses a channel paired to an identity or state). Therefore, specific augmented reality content may be generated for each of them (for instance for various objects in an exposition). This concept may be generalized for a 3D scene by adding a fourth device B (that is not coplanar to the others). Furthermore, the frame of reference may be partially determined using an inertial measurement system (for instance the magnetometer, and/or the accelerometer to detect the direction of gravity). Other visual elements of the scene can also be used, for example known elements, or the horizon.

Figure 22:
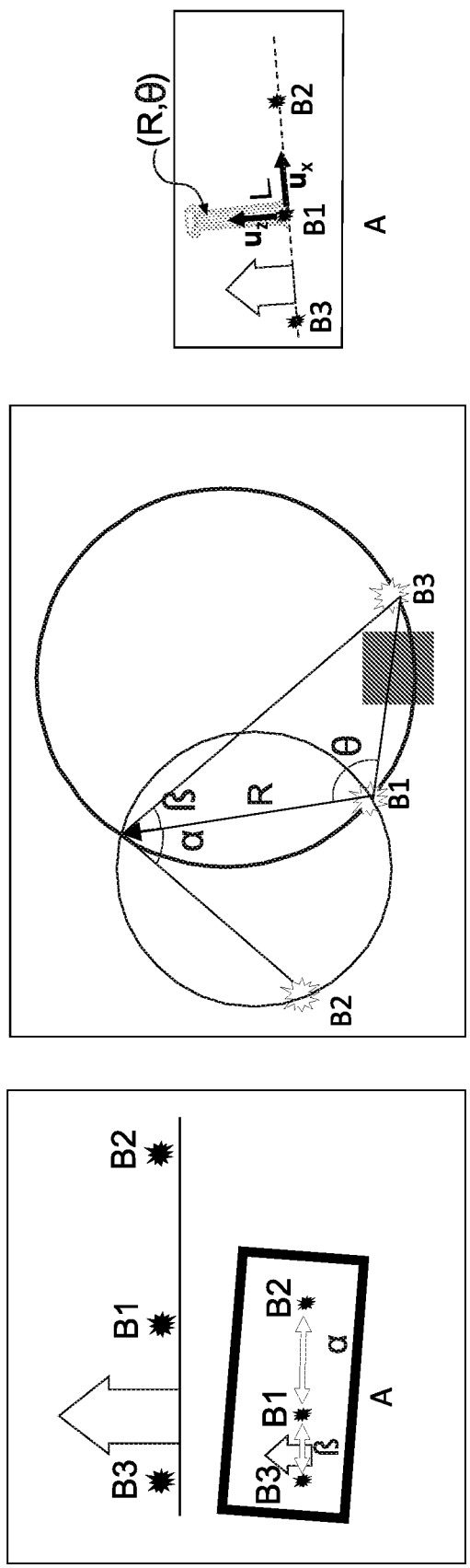
FIG. 22 shows a schematic view representing on the left: a scene containing 3 devices B forming a frame of reference around a building in the field of view of a device A, in the middle: a geometrical representation of the localization of the device A relatively to the devices B, viewed from above; and on the right: the display of the device A showing an augmented reality view of the scene.

FIG. 22 shows another application of the invention in which the location of a receiver device A may be detected relatively to a reference device consisting of a set of emitter devices B forming a frame of reference and that are installed at fixed positions (known to device A). For instance, in a 2D-situation where the device A and the devices B are coplanar (for instance if they are all at the same altitude), it is possible to compute the position of the device A using a frame of reference formed by 3 devices B. The position may be derived from the angular distances between devices B as seen by A (angular distances may be derived from the detected pixel position of the devices B, upon calibration of the camera). Once the position of device A is determined, and using the devices B as reference, it is possible to generate a view of a 3D augmented reality object seen from an angle that is contextual to the scene. This concept may be generalized for a 3D-situation by adding a 4th device B (that is not coplanar to the others). Furthermore, the frame of reference may be partially determined using inertial measurement system (for instance the magnetometer, and/or the accelerometer to detect the direction of gravity).

If the position of the emitter devices B is not known by the receiver device A, the frame of reference can still be used to determine the position of A relative to this frame.

In another application of the invention, the receiver device A may be a device capable of autonomous navigation (such as a drone or a car or equipment for a car), and a reference device made of a series of emitter devices B as light beacons may be installed for instance at a base (or homing/docking station). When the reference device is in the field of view of the camera of device A, the device A may calculate his own position relatively to the reference device in real-time (as described previously) and navigate to the base (or homing/docking station) or to any another position determined relatively to said reference.

Drones or cars might also have a light and/or a camera, and act as emitter end receiver mobile device. The method of the invention can then be used by each drone or car for detecting the presence and position of other drones or cars, and/or of fixed emitter devices, in order to avoid collisions or to detect their absolute or relative position.

In another application of the invention, a combined device AB may be equipped with a set of devices B forming a reference device, so that another combined device of the same type may be able to compute its own position relatively to the other AB device and/or the position of the other AB device relatively to itself. This principle may be extended to any AB devices mentioned previously in this text. For instance, such an AB device may be a device capable of autonomous navigation (such as a drone or a car). It may be able to detect the position of other AB devices of the same type in real-time and avoid colliding into them.

More generally, navigation may occur in a safer and more efficient way if an emitter/receiver mobile device AB capable of autonomous navigation (such as a drone or a car) uses a channel paired to a state representing its directional intention (such as whether it plans to keep going straight, left, right, decelerate, or is in an emergency situation, etc.), and with this system the information is always unambiguously linked to a specific detected object (they may also communicate this information wirelessly if the channel they use is paired with their identity instead of a state, for instance through a vehicular ad hoc network).

Figure 5:
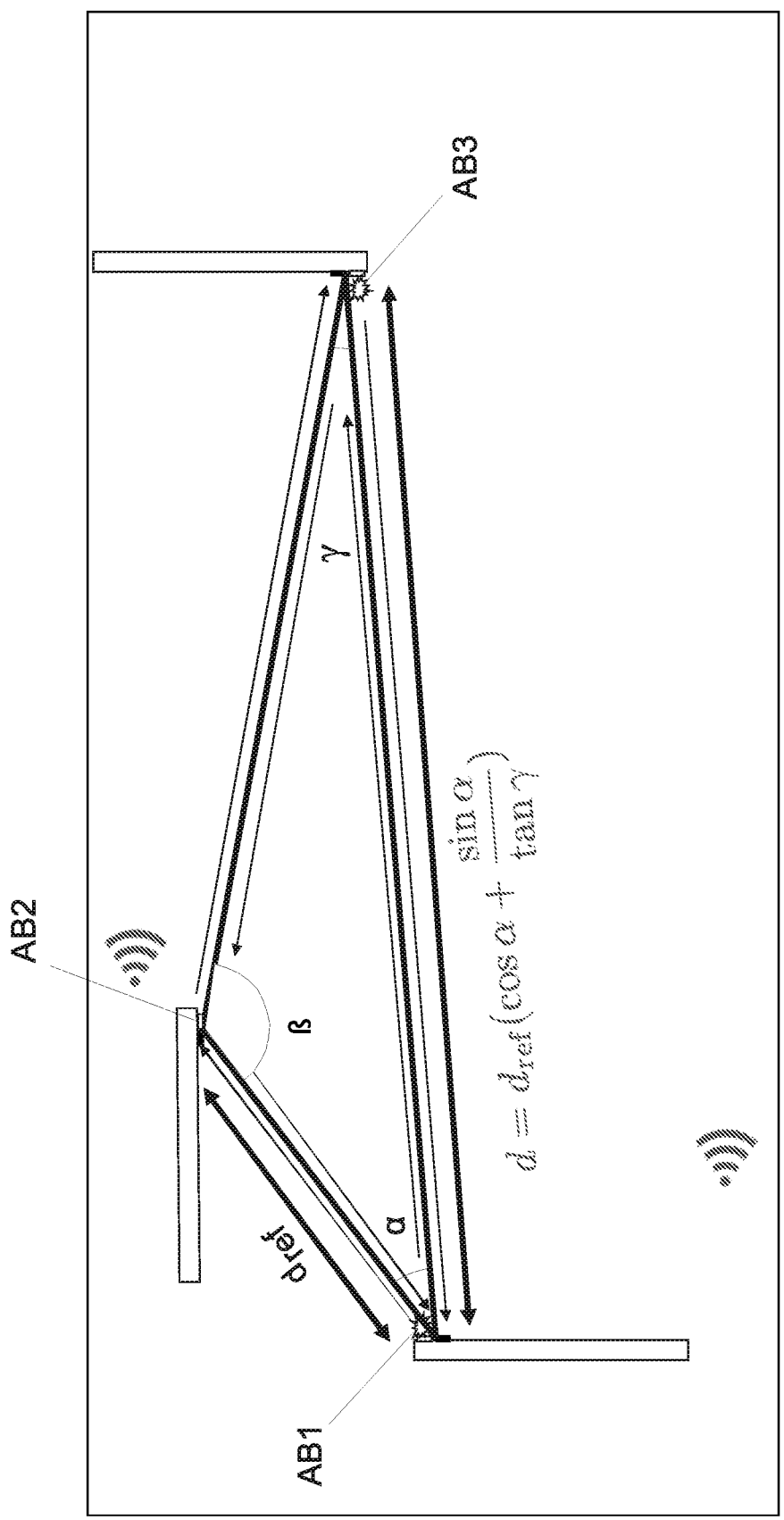
FIG. 5 shows an example of a system according to an embodiment of the invention, used for a geomatic application.

FIG. 5 shows another application of the present invention, for a geomatic solution. FIG. 6 shows a corresponding view on the display of the receiver mobile device A. In this embodiment, each of the mobile devices AB1, AB2 and AB3 are equipped with a camera, a light and can communicate wirelessly with the other devices. They are installed at various positions of a building site. The angle separating the two other devices can be computed using the horizontal angle of view of the camera and the pixel distance between them (normalized by the image width). This angle can be communicated to the other mobile devices via wireless communication. A calibration function taking optical aberrations into account can be used for more precision. With those three angle values, and since the distance $d_{ref}$ between the emitter and receiver mobile devices AB1, AB2 is known, the distance between the mobile devices AB1 and AB3 can be computed.

Another application of the invention may be in the context of a poll to the audience in a conference or auditorium. A presenter may ask the opinion of the audience on a certain matter, and the audience may choose among a set of possible answer. Each attendee may be equipped with an emitter device B, and each possible answer may be paired with a channel S (there may be as many possible answer as channel S). The presenter may be equipped with a device A. An augmented reality view may superpose a mark of a specific color for each answer on each detected device B in the audience, so that the presenter may see what a specific person has voted.

Another application of the invention may be the search for a lost person in a crowd, that may use a device B to advertise its identity and position. Another person looking for this person may use a device A to find it in the crowd by detecting the channel S it is paired to. Other applications of the invention may be implemented using the invention, for instance in the form of an application software running on a device A, B or AB.

FIG. 7 illustrates screen views that may be presented to players of an augmented reality aiming game based on the invention (for instance a first-person shooter game or a lasergame). The texts on those figures might be adapted to the language of the player.

On the figure, a player using the receiver device A intends to aim at emitter devices B and hit by touching the corresponding button on the touch surface of the display. The players' mobile devices may be equipped with camera and light and act as combined devices AB, in order to detect other players and be detected by them, as previously described. The combined devices may be a smartphone or a tablet for instance.

To aim at a player using the emitter device B, the player using the device A tilts and rotates this device to align player B light in the center of a crosshair zone displayed as an augmented element onto an image of the scene captured with his camera. The left part of FIG. 7 is a screen view of the receiver mobile device A during this process.

As shown on the right part of FIG. 7, once the aiming is good, player using A presses a virtual trigger button on his display or uses another user interface element as a trigger. A computer program is then executed by a processor in his device A, or remotely by the server C, in order to perform signal recognition algorithm (for instance based on DFT) in real-time and continuously onto all the pixels of the ROI defined by the target area, or in a rectangular or circular region around the target direction.

If an emitter device B paired with the channel S is detected within this region, the emitter device is considered to be hit. As the pixel position $(X_S, Y_S)$ of the targeted device B is known, it is possible to attribute game points according to the accuracy of the aiming (for instance whether $(X_S, Y_S)$ is in a 0, 5 or 10-points zone).

If the hit is successful, the user of emitter device B may be informed via wireless communication (directly or through the server C), and the player may receive visual and/or audio feedback, and lose life points. The user of mobile device A may also receive a visual and/or audio feedback that his hit was successful.

FIG. 8 represents schematically a session of four combined devices AB participating to an augmented reality aiming game, as described previously. The views show the information displayed on the display of four players AB1, AB2, AB3 and AB4. Those devices are connected wirelessly to each other, and to a server or cloud C. Player profiles may be created, that include player name, photograph of the player for various health conditions, recorded voice messages, or other user-specific information. The profiles may be setup before the game initialization and stored on the server C. Similarly, the players may be associated in teams and team profiles may be implemented. The server C may act as the session host (attributes a specific channel S to each device AB and inform all devices of the channel-device pairing), hold a register of the life points of each device, share player and team profiles with all devices and supervises communication from and to all devices. The player profile data may be used to show a specific personal avatar corresponding to each detected player in the Augmented Reality view displayed on each player device AB.

In order to initialize a game session, the welcome screen on each player device AB may propose to either "create a session" or "join a session". If "create a session" is selected, the server C may generate and send a unique barcode (such as a QR code) for display. Other players wanting to join the session may select the corresponding button, and the camera may be used to scan the barcode, allowing the server C to add them to the session. From here, the server may host the session by attributing a specific channel to the mobile device AB of each player (for example a specific blinking frequency or modulation scheme). Other methods of distributing channels to each device may be used.

Various augmented reality views may be implemented, such as zoom, night vision, etc. Other object relevant to the gaming may be added to the view (such as weapons). All sensors equipping the player's mobile device may be used to input given controls in the game. For instance, an accelerometer may be used to sense user movement that may be relevant to the game, such as quickly squatting to grab something on the floor.

Figure 9A:
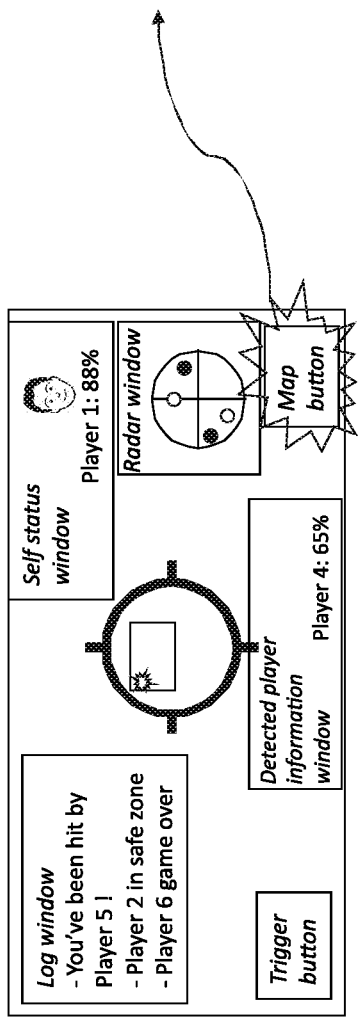
FIG. 9A shows the display view of a combined mobile device AB in an example of multiplayer game session based on the principle of FIG. 6 with additional geolocation information shared between members of a session.
Figure 9B:
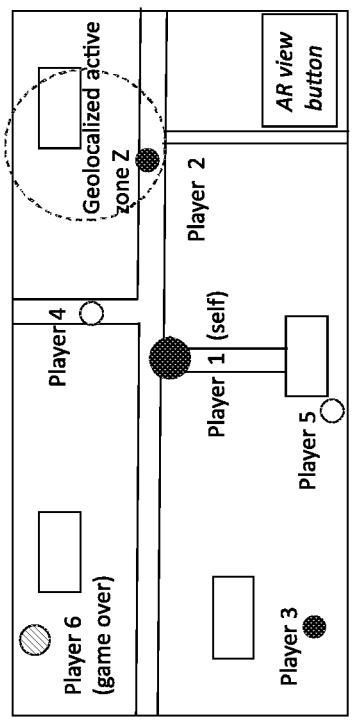
FIG. 9B shows a map view representing the position of various player participating in a gaming session.

FIGS. 9A and 9B show one embodiment of a game session in which at least some of the mobile devices participating to the session are equipped with a geolocation system (for instance based on a satellite navigation system, magnetometer, inertial measurement system, and/or an indoor position system). Those devices may share their geolocation to all devices participating to the session (for instance directly or through the server C). Each mobile device may then generate a geographical representation of the session with the location of each player, for instance as an augmented reality view (such as a "radar" view where each other player is represented by a dot on a circle, as represented on FIG. 9A. Using map data obtained by a map server accessible by the devices (for instance the server C), a map view where the location of each player is indicated, as represented on the map of FIG. 9B. A button or other user interface element on the touch surface may be used to switch between augmented reality view and map view.

A geographical zone Z may be defined as an active zone (for instance by the session host) with specific properties within the zone affecting the player going there (it may be for instance a safe zone, a forbidden zone, etc.).

Geolocation data may also be used before initiating the session. The server or cloud C may use geolocation data to provide a map of nearby players or team available for a game. The player or his team may challenge nearby player or teams and propose to meet at a definite geographical location for a game, for instance through a text message interface communicating via the server C. After meeting in the place, the players may initialize a game session. More advanced game schemes may be implemented such as tournaments at local or city scale, and supervised at the server level.

Figure 10:
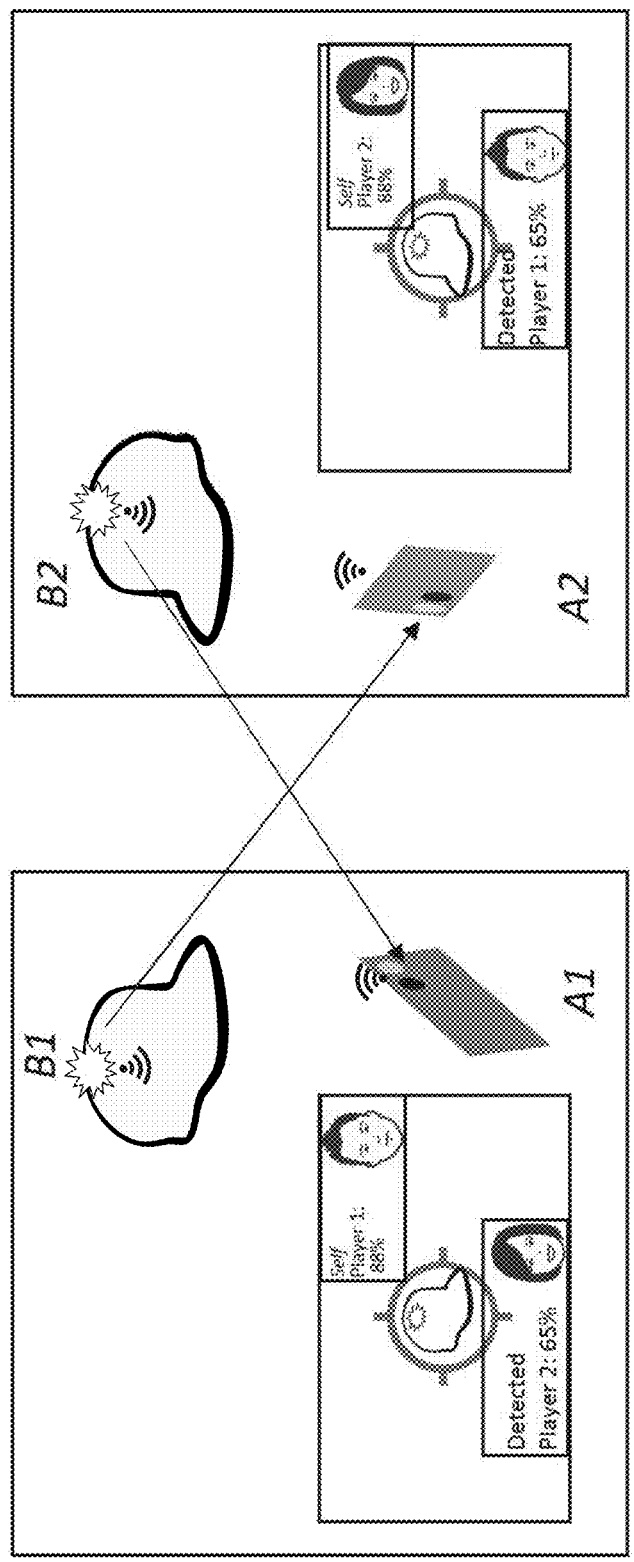
FIG. 10 shows an example of a game session based on the principle described in FIG. 7, in which each player is equipped with an emitter mobile device B and a receiver mobile A device that are wirelessly connected to each other.

FIG. 10 shows another embodiment of a game session, in which the two players are equipped with a receiver mobile device A with a display, and with another emitter mobile device B connected wirelessly to device A. The device B may be for instance a hat equipped with a series of lights covering all directions (such as LEDs). In the context of an aiming game, this would allow to aim at the head of a person from any direction. Light of which the spectrum is non-visible for the human eye but visible for the camera on receiver device A may be used, to prevent the players and passer-by to be disturbed by the visible blinking light.

An electronic device W (such as a router, a computer, a smartphone, a tv, a watch, or any connected object) equipped with a wireless communication system (typically WPAN as Bluetooth or WLAN), may serve as a wireless beacon for emitter (B), receiver (A) or combined devices (AB). The device W (as well as A, B, and AB devices) may be identified through a specific identifying signal broadcasted such as device or network name, the use of a universally unique identifier (UUID), its media access control (MAC) address, etc. A zone may be defined according to the wireless signal strength of device W, and the presence of the device within or outside of the zone may be defined as whether the received signal strength indication (RSSI) is above or below a predefined threshold (or whether the connection with device W is successful or not). A boolean parameter $Z_A$, $Z_B$, $Z_{AB}$ may represent the presence of device A, B, AB within the zone (it takes the value 0 if the device is outside the zone and 1 if it is inside). The evaluation of Z may be performed in real time, continuously or on-demand by each device A, B, AB or by the device W. The value of the parameter Z may be used as a selector within the execution of a computer program, for instance it may determine whether the device is within an active zone with property set in the context of an application software or a game (for instance a safe zone, in the case of a game). It may be communicated to the server or cloud C for postprocessing and/or sharing with the other connected devices. The session host, for instance the server or cloud C, may attribute which property is linked with active zone around W.

Figure 11:
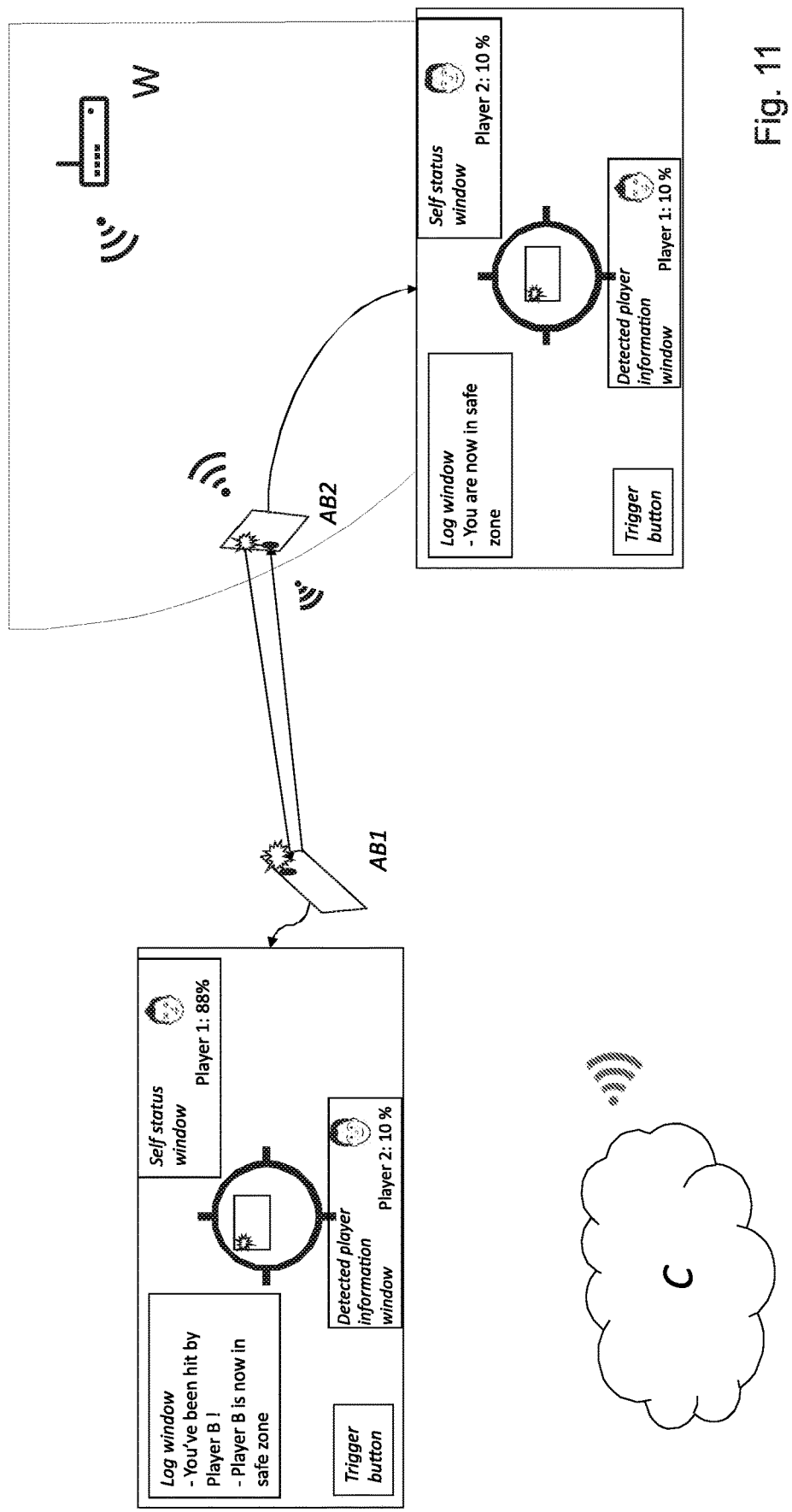
FIG. 11 shows a schematic view of an example of game session based on the principle described in FIG. 8 with a wireless beacon defining a safe zone.

FIG. 11 represents an embodiment of an aiming game session in which a wireless beacon W is used to define a "safe zone" (that may be a zone in which a player cannot lose life point) within the game.

The position of each device as determined with a beacon or with a geolocation system may also be used for limiting the search for devices to specific signals, to specific portions of the display and/or to specific period of times. It is for example useless to search for a specific channel in a frame if the emitter device associated with this channel is outside of reach of a receiver device.

FIG. 14 and following are bloc schemas representing various possible embodiments of a session in a system. Each device comprises several modules with dedicated functions. Arrows represent information flow between those modules. It is to be understood that in all the systems presented in this document, each device or modules represented may be optional, the list of devices and modules represented may not be exhaustive, each device or module may exist in multiple instances, each device or module may assume the function of several devices or modules as represented here, and that the concept of module represents a set of functionalities and not a specific hardware. A description of the function and implementation of some of the devices modules follows for clarification.

FIG. 14 represents a session with different implementation of receiver devices A and emitter device B. In emitter devices B, the control electronics 149 generates the signal emitted by the light. They might be equipped with an input device to determine the specific signal identifying the device or it may be hardwired in the electronics. In an embodiment (B1), the input device may be for instance a manual channel selector 150 for setting the frequency of a square signal in a simple electronic circuit to control the blinking of a light. In another embodiment (B2), the channel to used may be recorded in a memory (151). In another embodiment (B3), the input device may be a wireless module (144), through which the session host (145, for instance the cloud C) may communicate which channel S should be used. In receiver devices A, the camera 142 sends a video streams stream to the processor 141. In one embodiment, the processor of device A runs the detection algorithm (A1). In another embodiment, the server or cloud C may run the detection algorithm based on the data sent wirelessly by the device A (A2). The channel-device pairing information used by modules 140 may be set beforehand: a channel (S2) may be reserved to a device B (B2), or set before the session starts (S1 selected on B1), or the session host may communicate which channel is attributed to which device (B3 is set to use S3). This pairing information may also be updated over time.

A channel may be paired with a state that may be advertised by a device. Different devices may advertise the same state at the same time or at different time. Each device may change the advertised state or the channel of emission over time.

A processor 141 represents a device that may perform computation tasks, for instance based on a CPU and/or GPU and/or a microcontroller. It executes programs (software modules) stored in a memory (not shown) in order to carry out the method steps of the invention. In a smartphone, the processor might execute an operating system, such as iOS or Android, and applications. One of the applications might be used for performing the or some of the method steps described in the application.

A global data communication module 144 represents a system to exchange information with other mobile devices, a server or a cloud through a computer information network (CIN, such as the internet), for instance via WLAN (such as wi-fi), wireless mobile telecommunications technology, etc.

Figure 15:
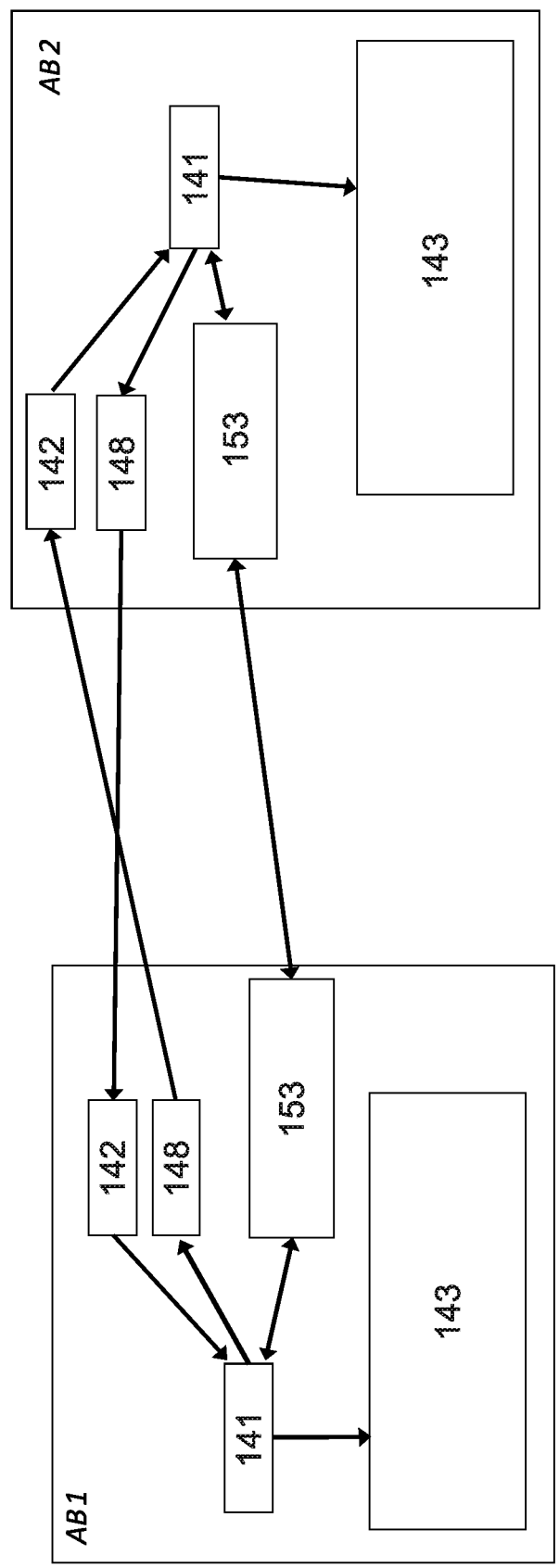
FIG. 15 shows a system flowchart of a session of combined devices AB (as represented in FIG. 3) interacting with each other, according to an embodiment of the invention.

FIG. 15 represents a session of combined mobile devices that may communicate wirelessly to each other (for instance to communicate to the other devices their name and which channel they are paired to).

A local wireless communication module 153 represents a system to exchange information wirelessly to nearby devices, for instance via wireless personal area network (WPAN, such as Bluetooth), wireless local area network (WLAN such as Wi-Fi), peer-to-peer Wi-Fi, mobile/vehicular/smartphones ad hoc networks (MANET/VANET/SPAN), wireless mobile telecommunications technology (from instance through cellular network such as GSM or UMTS), and/or through a computer information network (C/N such as the Internet), etc.

Figure 16:
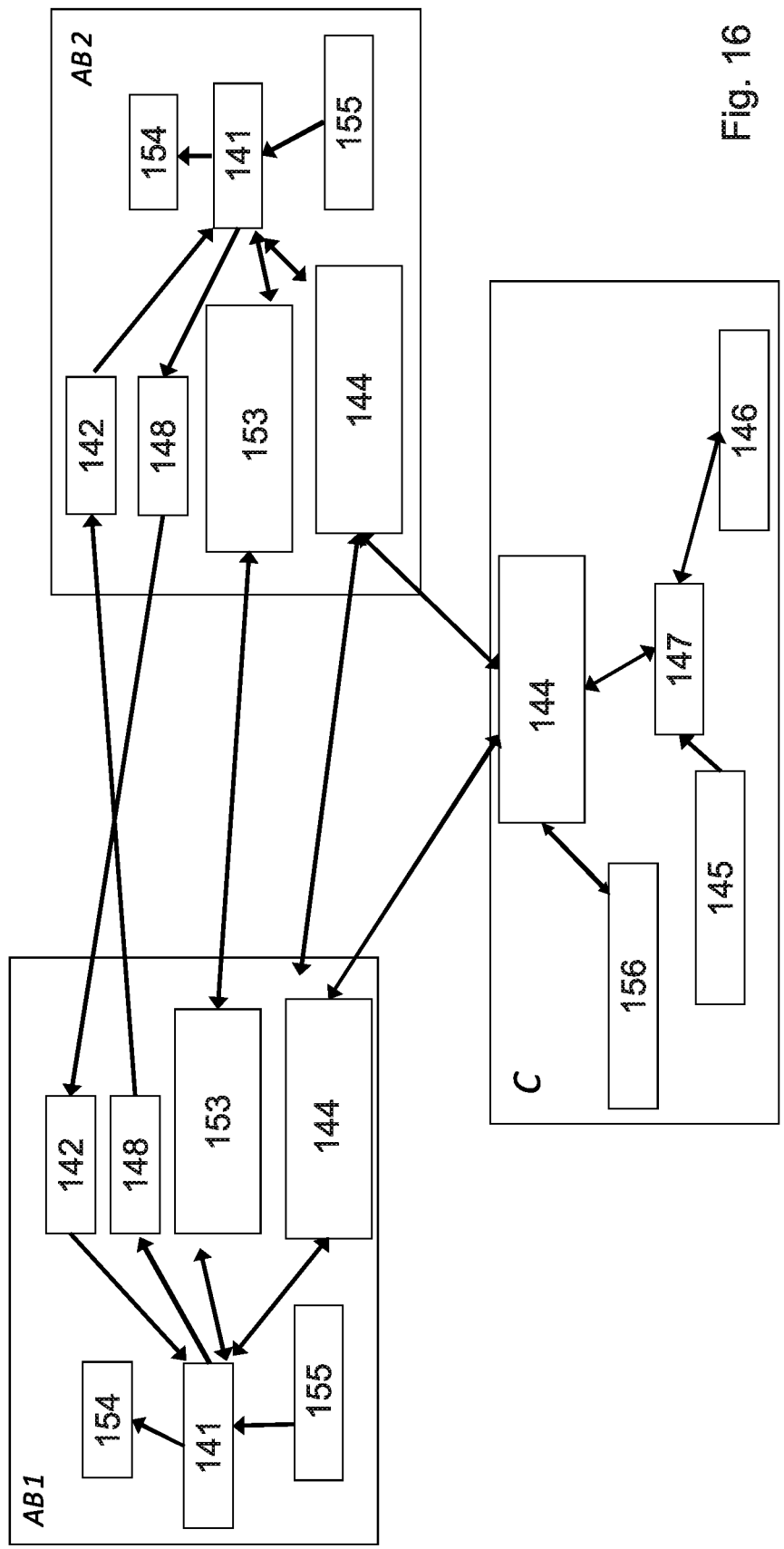
FIG. 16 shows a system flowchart representing a session of combined mobile devices AB equipped with a display and a geolocation system, and with access to a server C hosting the session (as in the game session represented in FIG. 7), according to one embodiment of the invention.

FIG. 16 represents a session of combined devices AB1, AB2 that may communicate wirelessly to a server C hosting the session (module 145 represents the task of hosting the session). Each device is equipped with a geolocation system 155 and a display 154 that may show an augmented reality view, as in the game example shown in FIGS. 9A and 9B. The server C may have access to other servers 156, for instance a map server.

A geolocation system 155 represents a system to determine the geolocation of the device, for example based on a Satellite navigation system (such as GPS, GLONASS, etc), an indoor positioning system (IPS, such as Wi-Fi positioning system), by triangulation based on a GSM or other wireless signal, and/or based on an inertial measurement unit (magnetometer, accelerometer and/or gyroscope).

Figure 17:
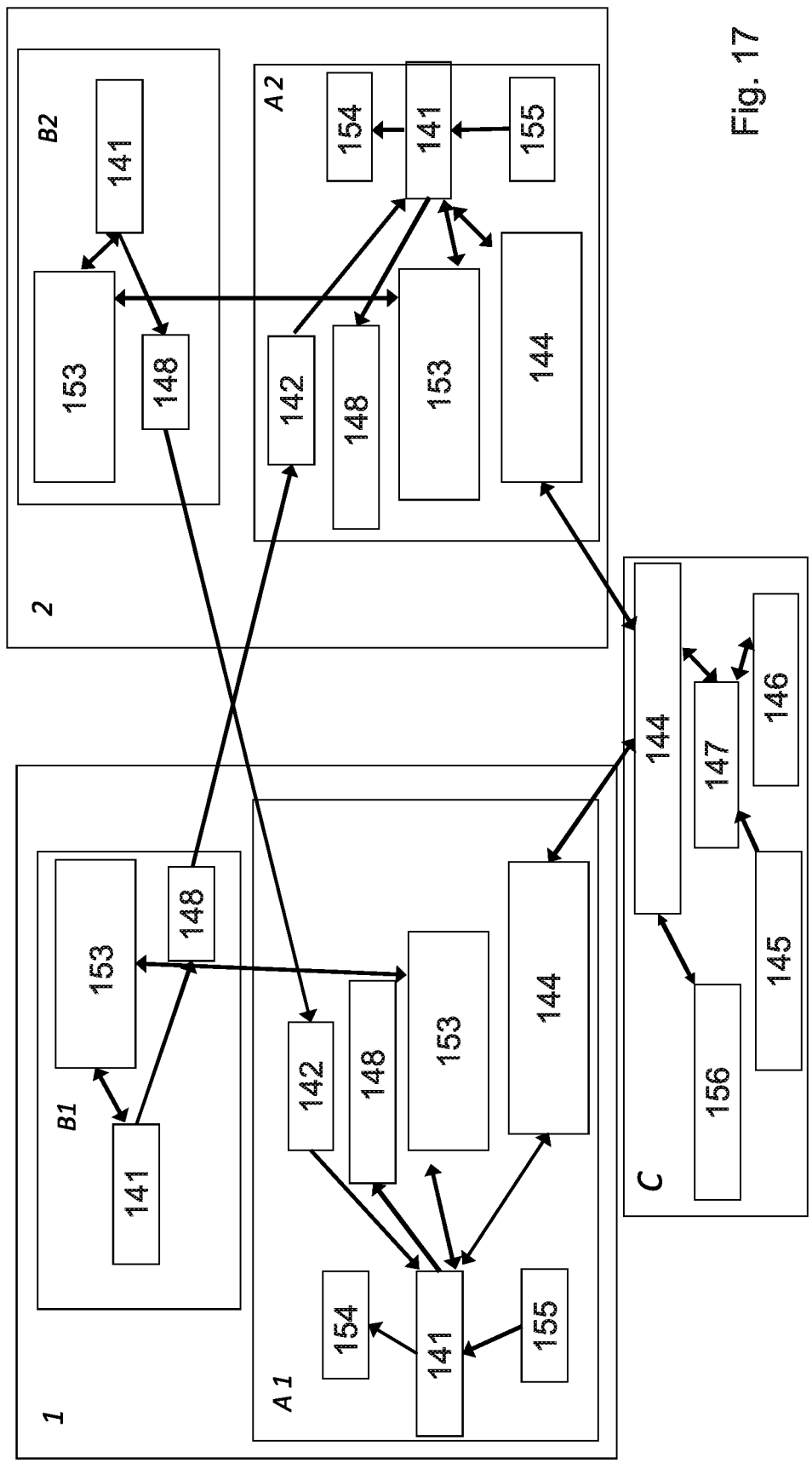
FIG. 17 shows a system flowchart representing a session, in which each user is equipped with a receiver device A and an emitter device B connected wirelessly to each other (as in the game session represented in FIG. 8), according to one embodiment of the invention.

FIG. 17 represents a session in which each user 1, 2 has a receiver device A and an emitter device B connected wirelessly to each other (as in the example shown in FIG. 10).

Figure 18:
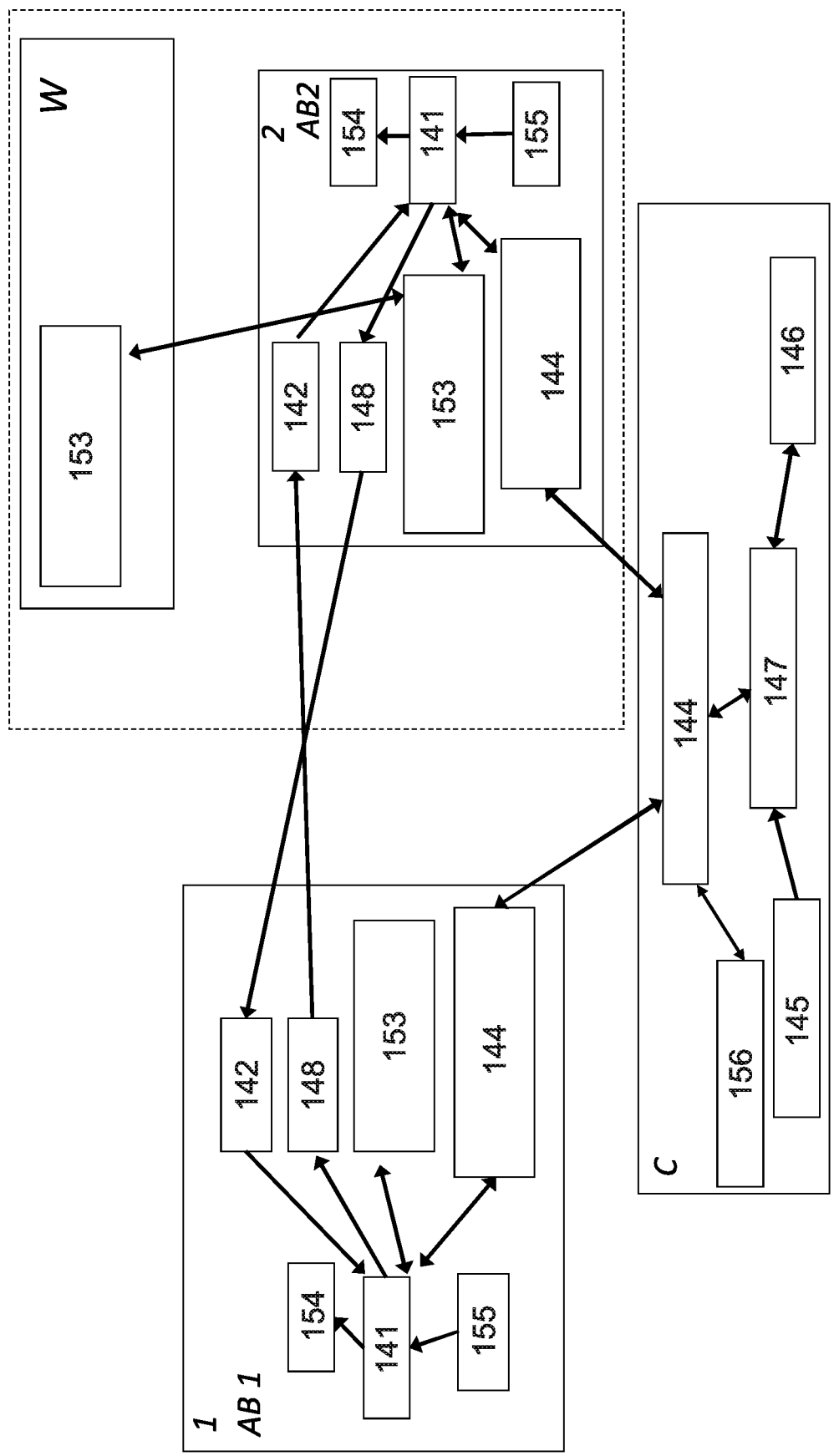
FIG. 18 shows a system flowchart representing a session of combined mobile devices AB interacting with a wireless beacon W defining an active zone (as in the game session represented in FIG. 9), according to one embodiment of the invention.

FIG. 18 represents a session of combined devices AB1, AB2 in the presence of a wireless beacon device W (as in the example shown in FIG. 11).

The invention claimed is:

1. A method for detection of an emitter device equipped with a light by a receiver device equipped with a camera, comprising:
   the emitter device emits a light-modulated signal;
   the receiver device captures a series of frames with said camera;
   the modulated signal is detected from said frames;
   the pixel position of the emitter device on a said frame is detected, in which:
   at least one said emitter device is equipped with a camera and with a light and act as a combined emitter-receiver device;
   at least one said receiver mobile device is equipped with a light and emits a second light-modulated identification signal to advertise its identity or state and act as another combined emitter-receiver device.

2. The method of claim 1, wherein a plurality of emitter devices emit a plurality of signals with a different light modulation in order to advertise their identity or slate,
   wherein said receiver device determines the identity or state of emitter devices from said modulation.

3. The method of claim 2, wherein a plurality of emitter devices emit at the same time, and wherein the receiver device detect a plurality of light modulated signals in one frame or in a plurality of successive frames, distinguishes the modulated signals from their modulation, and assign each detected modulated signal to an emitter device.

4. The method of claim 1, further comprising:
   defining a region of interest on said frame;
   searching said modulated signal in said region of interest only.

5. The method of claim 1, wherein the modulated signal is detected by the receiver device by cyclically performing a signal recognition algorithm on pixels of said series of frames and continuously updating the pixel position of the detected device.

6. A method for detection of an emitter device equipped with a light by a receiver device equipped with a camera, comprising:
   the emitter device emits a light-modulated signal;
   the receiver device captures a series of frames with said camera;
   the modulated signal is detected from said frames;
   the pixel position of the emitter device on a said frame is detected wherein the modulated signal is detected with a transform on at least some pixels of the last N frames.

7. The method of claim 6, wherein said transform is a Discrete Fourier Transform on pixel intensity for the last N frames, on all pixels of a region of interest.

8. The method of claim 1, wherein the phase of the modulated signal is set relatively to a time base shared between the emitting and receiving devices, and wherein the modulated signal is detected through a phase-sensitive detection or correlation with the signal searched, on at least some pixels of the last N frames.

9. The method of claim 5, comprising:
   identifying the pixel with maximum absolute value of the Discrete Fourier Transform on pixel intensity for the last N frames (N>=1) in a region of interest;
   determining if said value is above a predefined threshold.

10. The method of claim 2, wherein the light-modulated signal is a square signal in which the light is periodically set on and off, wherein the identity or state of each emitter device is paired with a device specific frequency, with a device specific phase modulation or with a device specific frequency modulation.

11. The method of claim 1, comprising a preliminary step of pairing different light-modulated identification signals respectively with a plurality of different emitter devices, and communicating the signal paired with each emitter device to said receiver devices.

12. The method of claim 1, comprising a step of pairing one common light-modulated identification signals with a plurality of different emitter devices.

13. The method of claim 2, used in an augmented reality application software or game, wherein an augmented reality element is displayed at the position of the identified emitter device in a video stream of the scene.

14. The method of claim 1, wherein at least one emitter device is an emitter mobile device, and wherein the position and/or distance of this emitter mobile device is determined based on said pixel position.

15. The method of claim 1, wherein the position of the receiver device is determined based on the pixel position of at least one emitter device.

16. The method of claim 2, wherein the identification of the emitter device by the receiver device or by a server or cloud is communicated to the emitter device over a wireless interface.

17. A device comprising:
a light;
a camera;
a display;
a processor;
a memory storing a computer module arranged for controlling said light in order to emit a light-modulated identification signal to advertise the identity or state of said device, and for detecting blinking pixels corresponding to other devices in images captured with said camera using a method for detection of an emitter device equipped with a light by a receiver device equipped with a camera, comprising:
the emitter device emits a light-modulated signal;
the receiver device captures a series of frames with said camera;
the modulated signal is detected from said frames;
the pixel position of the emitter device on a said frame is detected, in which:
at least one said emitter device is equipped with a camera and with a light and act as a combined emitter-receiver device;
at least one said receiver mobile device is equipped with a light and emits a second light-modulated identification signal to advertise its identity or state and act as another combined emitter-receiver device or wherein the modulated signal is detected with a transform on at least some pixels of the last N frames.

18. The device of claim 17, said light being an infrared light, said camera being an infrared camera.

19. The device of claim 17, being one among:
a smartphone;
smartglasses;
a drone
an equipment for a car.

20. A computer program product comprising a non-transitory computer readable medium, the non-transitory computer readable medium having computer-executable instructions for causing a processor of a mobile device to perform the method of claim 1 or claim 8.

* * * * *